(12) United States Patent
Batra et al.

(10) Patent No.: US 7,702,718 B2
(45) Date of Patent: Apr. 20, 2010

(54) PROVIDING ENTERPRISE INFORMATION

(75) Inventors: Alok Batra, San Jose, CA (US); Olagappan Manickam, Cupertino, CA (US); Danko Zlokapa, San Francisco, CA (US); Rajendra Kulkarni, Pune (IN); Chetan Gadgil, Pune (IN)

(73) Assignee: Cisco Technology, Inc., San Jose, CA (US)

(*) Notice: Subject to any disclaimer, the term of this patent is extended or adjusted under 35 U.S.C. 154(b) by 1265 days.

(21) Appl. No.: 10/815,008

(22) Filed: Mar. 30, 2004

(65) Prior Publication Data

US 2005/0223021 A1 Oct. 6, 2005

(51) Int. Cl.
G06F 15/16 (2006.01)

(52) U.S. Cl. .................... 709/201; 709/223

(58) Field of Classification Search ............ 709/201, 709/202, 223, 224, 226
See application file for complete search history.

(56) References Cited

U.S. PATENT DOCUMENTS

| 5,881,232 | A | 3/1999 | Cheng et al. | |
| 6,557,025 | B1* | 4/2003 | Hattori et al. | 709/202 |
| 6,633,835 | B1* | 10/2003 | Moran et al. | 702/190 |
| 6,658,568 | B1* | 12/2003 | Ginter et al. | 713/193 |
| 6,691,067 | B1* | 2/2004 | Ding et al. | 702/186 |
| 2001/0041996 | A1* | 11/2001 | Eder | 705/7 |
| 2003/0009533 | A1 | 1/2003 | Shuster | |

OTHER PUBLICATIONS

Sep. 15, 2006, PCT Search Report.

* cited by examiner

*Primary Examiner*—Ramy M Osman
*Assistant Examiner*—Marshall McLeod
(74) *Attorney, Agent, or Firm*—Schwegman, Lundberg & Woessner, P.A.

(57) ABSTRACT

Separate executable agents each perform tasks on associated information that is changing over time, to produce current information, Inputs and outputs are delivered among agents to enable assembly of a body of aggregated and summarized management information, based on the current information, to be used to manage at least a portion of an enterprise.

37 Claims, 30 Drawing Sheets

Figure 1:
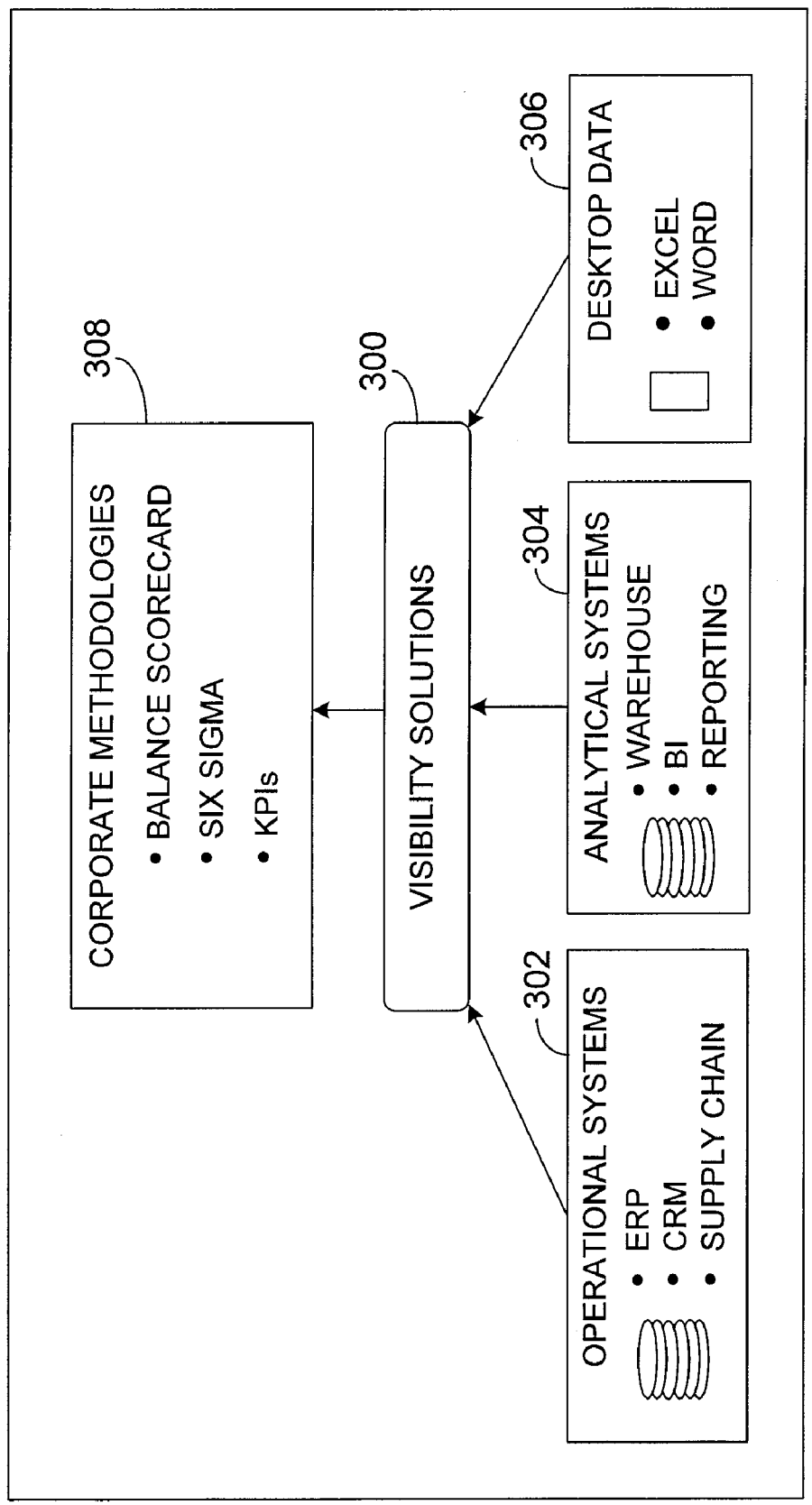

| Category | Description | Services/Subsystems | Dependencies |
|---|---|---|---|
| Infrastructure | Set of services that provide the Service Framework. Every service complies with the service framework. | Container Registry Monitor Session | |
| Common | Used by all other services for all common application logic. | Message Security Log Cache | Common |
| Base | Base level independent Services | HyperCube Inventory Notify | Common |
| BIN | Set of services that provide BIN (Business Information Network) framework. | BIN Runtime Bin Management BIN Admin BIN Publisher | Common |
| Application | Application-level Services that uses Base Services. Modular services that do not directly address business requirements. | Metrics Model Alert Assembly Analytics | Common Base |
| Business | Set of services that address business requirements. Uses other services to provide integrated functionalities. | Threshold Monitor Alert Notify | Common Base BIN Application Business |
| Presentation | Services that manage and render dashboards. | Presentation Runtime Presentation Management | Common BIN Base Application Business |
| Designer | Provides Framework for CXO Studio | Dashboard Designer Network Builder Metrics Modeler User Manger Alerts Manger | Common BIN Base Application Business |

FIG. 9

| Category | Services | Can Access |
|---|---|---|
| Infrastructure | Container<br>Registry<br>Monitor<br>Session | None |
| Common | Message<br>Security<br>Log | Common Services<br>  Message<br>  Security<br>  Log |
| Base | HyperCube<br>Inventory<br>Notify | Common Services<br>  Message<br>  Security<br>  Log |
| BIN | BIN Runtime<br>Bin Management<br>BIN Admin<br>BIN Publisher | Common Services<br>  Message<br>  Security<br>  Log |
| Application | Metrics Model<br>Alert<br>Assembly<br>Analytics | Common Services<br>  Message<br>  Security<br>  Log<br>Base<br>  HyperCube<br>  Inventory<br>  Notify |
| Presentation | Presentation Runtime<br>Presentation<br>Management | Common<br>  Message<br>  Security<br>  Log<br>Base<br>  HyperCube<br>  Inventory<br>  Notify<br>Application<br>  Metrics Model<br>  Alert<br>  Assembly<br>  Analytics |
| Designer | Dashboard Designer<br>Network Builder<br>Metrics Modeler<br>User Manger<br>Alerts Manger | All Services |

FIG. 17

| Service | Channel Name | Message Type | Description |
|---|---|---|---|
| Log | System.Log | LogMessage | Log information is published in this channel by any client |
| Security | System.Security | UserMessage | Security Service publishes Messages when Users are added or dropped in the system. Other services can use this channel for synchronizing their internal state. |

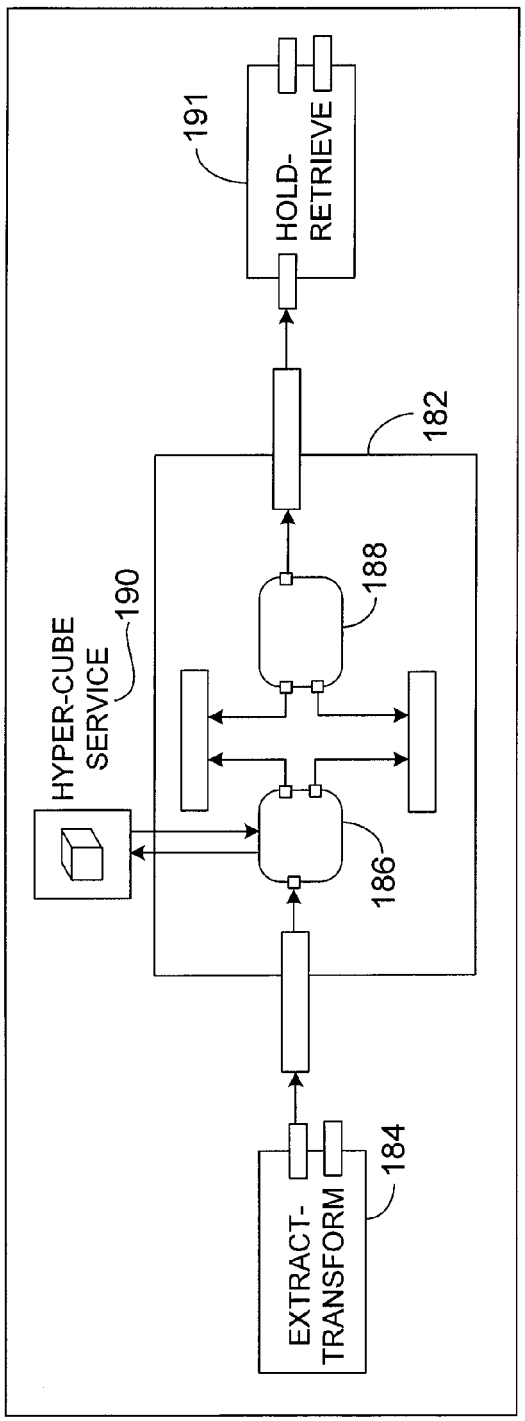
FIG. 34
FIG. 35
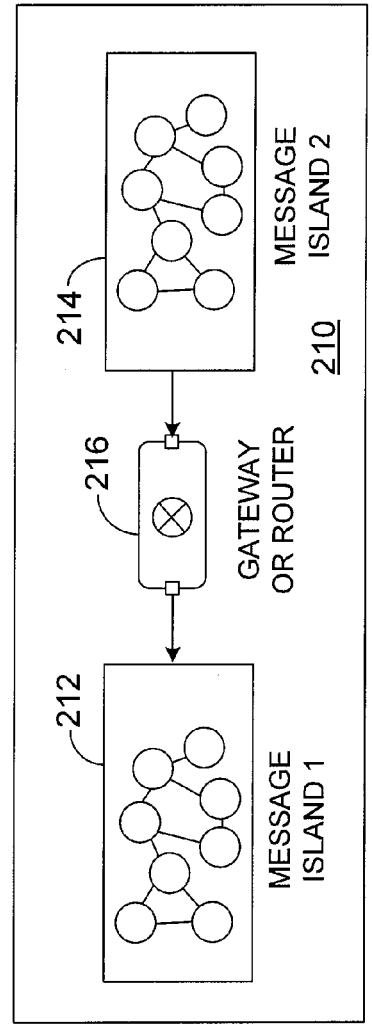
FIG. 36

PROVIDING ENTERPRISE INFORMATION

BACKGROUND

This description relates to providing enterprise information.

Enterprise managers, for example, need to be able to view current, consistent, filtered information, presented in conformity with the enterprise's business models, to be able to manage the enterprise (or portions of it) effectively. The underlying data and intelligence on which the management information is based is typically distributed across the enterprise, scattered over many systems and processes, and hidden from the view of the managers. The data is often fragmented, inconsistent, and stale when it reaches the managers. Any new request by a manager for information is fulfilled by ad-hoc processes which patch data from the existing information sources. Changes in business methodology render the "hard-coded" information processes inappropriate and create information corruption. Managers play a role as business analysts by applying their loose scenario-based perceptions to such information. Drilling down into the lower levels of information is difficult.

The kinds of information that the managers need to be able to view are often high level measures (also called metrics) of the performance of the enterprise, for example, a set of key performance indicators (KPIs) presented through methodologies such as balanced scorecard and six sigma. The sources of raw data on which such metrics are built may include operational systems, analytical systems, and desktop data. Operational systems include enterprise resource planning (ERP) systems such as those offered by SAP; customer relationship management (CRM) systems such as those offered by Siebel, supply chain systems, manufacturing systems. Analytical systems include business intelligence systems such as those offered by Cognos, Hyperion, and Business Objects; warehousing systems such as those offered by Oracle and Microsoft; and reporting systems such as those offered by Crystal. Desktop data may be embedded in Excel spreadsheets and other documents.

SUMMARY

In general, in one aspect, the invention features a method that includes causing separate executable agents each to perform tasks on associated information that is changing over time, to produce current information, delivering inputs and outputs among agents to enable assembly of a body of aggregated and summarized management information, based on the current information, to be used to manage at least a portion of an enterprise.

Implementations of the invention may include one or more of the following features. The agents are organized in accordance with a network model. The agents have ports to send and receive the inputs and outputs. At least some of the inputs and outputs pass through routing devices between agents. The routing devices comprise hubs, routers, and gateways. The agents are part of a network that conforms to the network model and includes network links to deliver the inputs and outputs. At least some of the links are temporary. The temporary links define a dynamically configured network that conforms to the network model. At least some of the links are persistent. A group of the agents operate in a subnetwork that conforms to the network model, and the subnetwork comprises a portion of a network that conforms to the network model. Another instance of the subnetwork comprises a portion of another network that conforms to the network model. The agents are distributed. The agents are distributed at least in part geographically. At least some of the associated information is stored in databases. At least some of the inputs and outputs comprise events. At least some of the inputs and outputs comprise data. The method of claim in which elements that conform to the network model declare their capabilities to one another. The agents comprise at least part of a network that conforms to the network model and a process external to the network makes requests to the network for at least portions of the current information for use in assembling the body of management information. The external process comprises an expert engine. The expert engine is driven by a model.

In general, in another aspect, the invention features a method that includes (a) obtaining, from distributed repositories of data related to an enterprise, current data to be used in connection with managing at least a portion of the enterprise, the data from different ones of the repositories having formal and temporal inconsistencies, (b) enhancing the formal consistency of data received from different ones of the repositories, (c) temporarily storing portions of the enhanced data to enhance temporal consistency of the data, (d) using a model of the portion of the enterprise to analyze the temporally and formally enhanced data and to generate resulting management data, (e) distributing the management data in a time frame that is current relative to the current data obtained from the repositories, and (f) the identity of the current data changing adaptively over time based on the model and on the resulting management data that is to be distributed.

Implementations of the invention may include one or more of the following features. The current data is pulled from the repositories, or pushed from the repositories. The management data is stored for later use. The management data is distributed by notification to a process that uses the data. The management data is distributed by automated delivery of the data to a process. The current data is obtained in response to a need for the resulting management data to be distributed. The current data is obtained at a time based on when the resulting management data is to be distributed. The identity of the current data that is obtained is based on the identity of the management data that is to be distributed.

In general, in another aspect, the invention features a method that includes processing enterprise data from distributed repositories in an assembly line fashion to produce management data that is useful in managing at least a portion of the enterprise, the assembly line including separate executable agents to perform tasks on the data, the agents including: a cleansing agent to process data that would not otherwise be useful in producing the management data, a normalizing agent to normalize the data, a transformation agent to enhance the consistency of the data, an assembler agent to assemble data to form the management data, and a staging agent to get the data ready for further processing, the sequence and tasks of the agents in the pipeline being adaptable to changes in the portion of the enterprise being managed.

In general, in another aspect, the invention features storing and updating, in a cube, multi-dimensional current data about a portion of an enterprise, storing, in a cube, data defining relationships between metrics used to manage a portion of the enterprise and the multi-dimensional current data, storing, in a cube, metadata about the multi-dimensional current data, and using the cubes to access current data in responding to queries, to generate management information useful in managing the portion of the enterprise.

In general, in another aspect, the invention features (a) accumulating current information about an enterprise from distributed repositories using separate executable agents organized in a network model, the current information that is accumulated being determined by predefined analytical processes that are associated with functional aspects of the enterprise and that use the current information to produce functional information about the enterprise, the enterprise belonging to a class of enterprises, and (b) processing the functional information to produce resulting management information, the processing being done in an application that is reusable for other enterprises belonging to the class.

Implementations of the invention may include one or more of the following features. The class comprises manufacturers. The class comprises financial services enterprises. The functional aspects include at least one of financial, supply chain, information technology, and sales.

In other aspects, the invention includes such features (and other features) expressed as media bearing instructions to cause a machine to perform certain actions, or as a system or apparatus.

Other features and advantages will become apparent from the description and the claims.

DESCRIPTION

FIGS. 1 through 8, 10 through 16, and 19 through 48 are block diagrams.

Figures 18, 19:
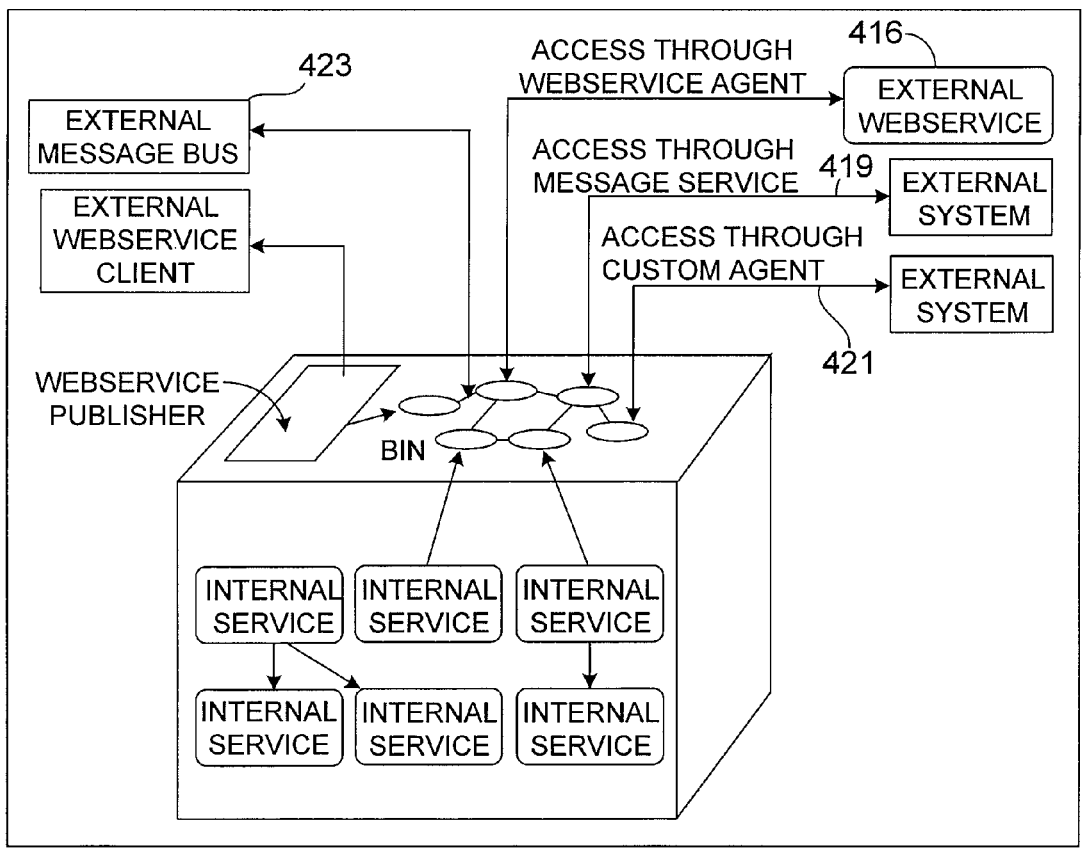

FIGS. 9, 17, and 18 are tables

As shown in FIG. 1, by providing appropriate mechanisms (which we sometimes refer to as a visibility solution or visibility system or a system 300) to acquire, store, process, and analyze selected raw enterprise information, as needed, it is possible to efficiently deliver selected, consistent, secure and highly current high-level information (which we sometimes refer to as metrics) to managers to enable them to manage portions or all of the enterprise.

Information held in or produced by operational systems 302, analytical systems 304, and desktop data 306, for example, and associated intelligence are distributed across the enterprise. To produce real-time metrics 308, changes and additions to the underlying information may be handled as real-time events. Accuracy of measurement of the underlying information may be balanced with latency of measurement to produce reliable information. To reduce latency, much of the raw information may be left at the sources and only selected information is aggregated and stored. The distributed information changes in real time and a goal is to generate reliable metrics with minimum latency using the distributed information. The real-time distributed information is handled using the concept of a network that we sometimes call a business information network (BIN). In some examples, a BIN may be based on a message model.

Figure 2:
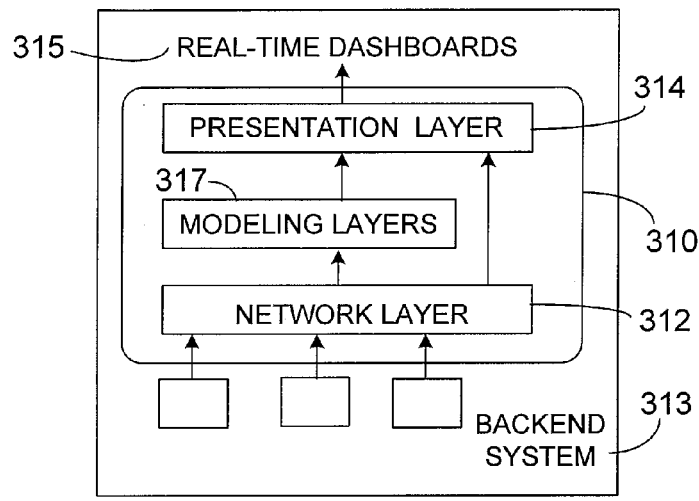

The visibility system is organized in layers 310 (FIG. 2). The BIN is modeled at the network layer 312. The underlying data is obtained from backend systems 313. The presentation layer 314, for example, displays the generated metrics in a manner that is easily consumable by managers (we also sometimes use the word executives instead of managers) using so-called dashboards 315. The presentation layer along with the network layer are capable of displaying the metrics in real-time.

The system also includes several modeling layers 317, in which the question of what information or metrics are needed by the manager is decoupled from the question of how those metrics are generated. The modeling layer may manage the reliability of generated metrics and codify best practices for managing and viewing metrics. The modeling layer may also embody aspects of business models that define what information is useful to managers and how it can be generated from the underlying data.

The Network Layer

Figure 3:
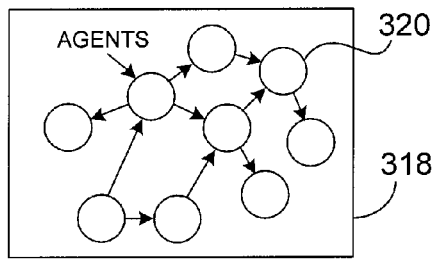

As shown in FIG. 3, the BIN 318 is modeled as a set of agents 320 connected in a network. An agent communicates with the rest of the world asynchronously using messages. An agent can both consume and/or produce messages. Agents perform specialized functions and they are building blocks of a network. Each agent is independent of other agents, which makes them reusable in any number of BINs.

Figure 4:
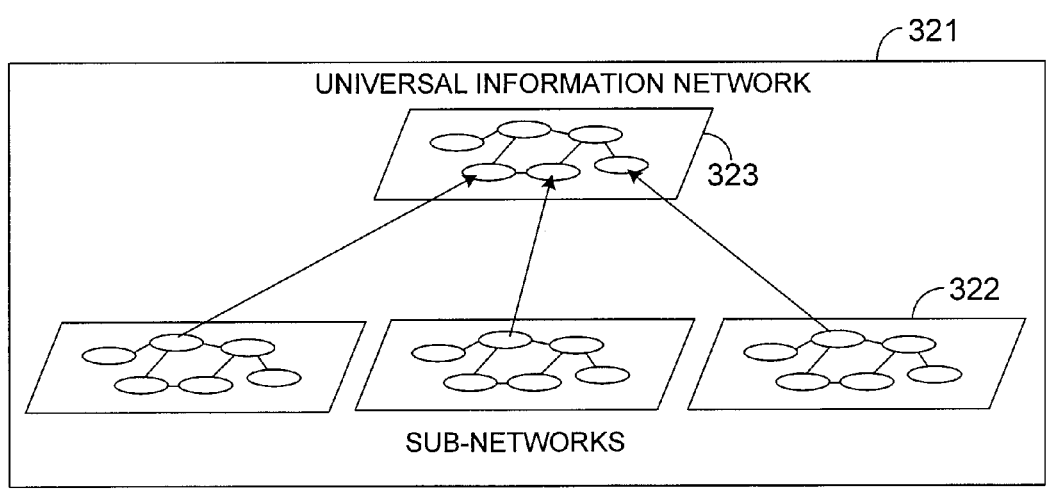

BINs are built to handle effectively real-time distributed information. A BIN can easily deal with real-time events because the participating agents can consume and/or produce asynchronous messages. As shown in FIG. 4, a BIN 321 can be broken into sub-networks 322, which can be geographically distributed. All the sub-networks collectively form a so-called universal BIN or universal information network 323.

Agents that participate in a BIN may have different types of functions, for example, extracting data from external web services or data sources, transforming data, analyzing and/or aggregating information, storing or retrieving information, and monitoring information changes. Also, special network elements, such as routers and gateways, control message flow in a network and between networks. By connecting agents together, distributed networks can be formed that can aggregate, generate and/or monitor metrics in real-time.

The Modeling Layers

In a so-called declarative approach to service delivery, an end user need only declare what it wants to get it. In a so-called procedural approach, an end user controls the flow of logic and achieves what it wants by programming the logic. The declarative model focuses on "what" while the procedural model focuses on "how". In some examples, the network layer of the system is close to a procedural model. The modeling layers server the function of enabling a translation from the procedural approach of the network layer to a declarative approach. Thus, a combination of declarative and procedural models is used in the system.

The modeling layers, among other things, map the what to the how. The mapping can either be done manually or inferred automatically. If the mapping is fully automated, the model is purely declarative. Even if the mapping is done manually, modeling layers are useful to decouple the definition from the implementation details and improves the usability of the system.

Figure 5:
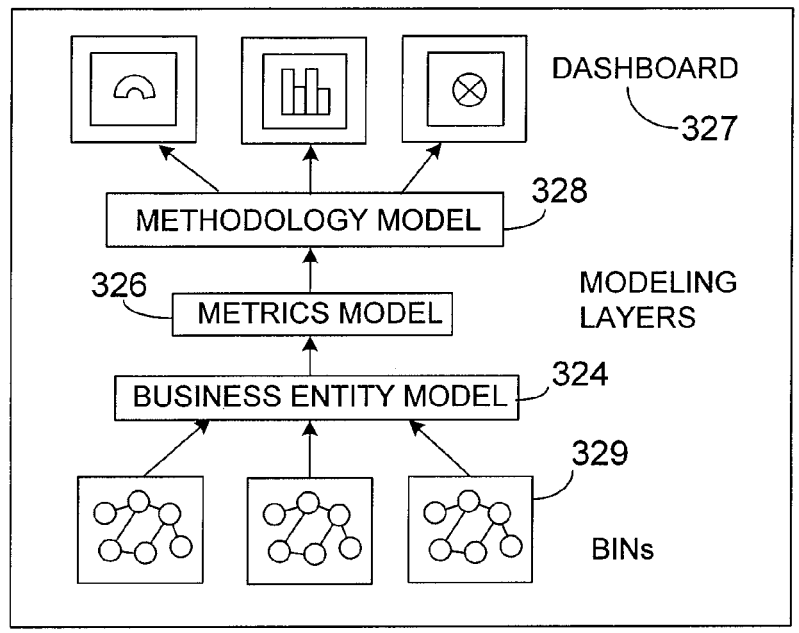

As shown in FIG. 5, the modeling layers may include a business entity model 324, a metrics model 326, and a methodology model 328.

Information in an organization is spread across several (or many) applications (or data sources) 329 each having a personal business information model. The function of the business entity model is to express and implement a universal model in the context of the enterprise that spans all applications and maps the universal model to the different native application models.

In the system, key performance indicators (KPIs) are modeled as metrics that are expressed in N-dimensional hypercubes that conform to a hypercube model (described later). The metrics modeling layer 326 creates a virtual cube of metrics or a virtual warehouse that separates the definitions of the metrics from the details of how to generate them. A dashboard designer (by dashboard 327 we mean the application that presents the management information to the manager) can then present any metrics from the virtual cube to the end user as tables or charts. The information that contributes to the metrics is distributed and captured through BINs. The metrics modeling layer creates derived metrics, sets up thresholds and targets on metrics, and estimates the accuracy and reliability of metrics.

The methodology model 328 has the function of organizing and managing metrics in an industry standard manner (like balanced scorecard, six sigma, etc.) to which end users are standardized on or accustomed.

The Presentation Layer

Figure 6:
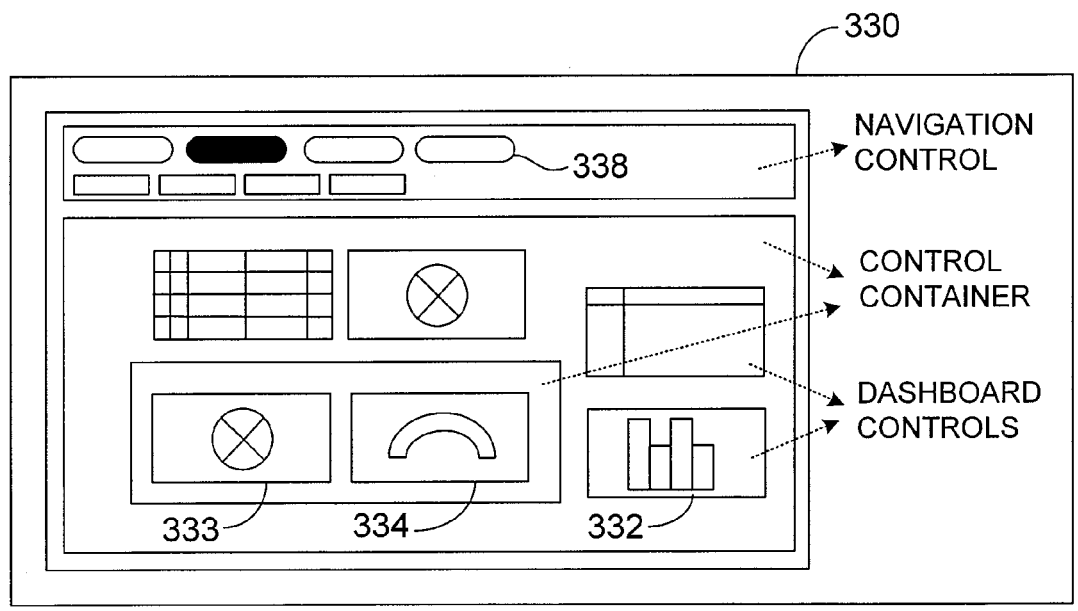

As shown in FIG. 6, metrics are presented to end users as a dashboard 330. Dashboard controls 332 are building blocks of a dashboard. They present metrics generated by the network layers and/or the modeling layers. Dashboard controls are collected in control containers 334. A control container can hold controls and other containers. A control container offers a shell to host the controls and provides features like control-to-control communication, traversal from one control to the other, and user interaction. Controls can operate both in passive and active modes. In passive mode they pull information once and in active mode they display live updates.

Navigation controls 338 enable the user to navigate from dashboard to dashboard and within a dashboard.

System Architecture

Figure 7:
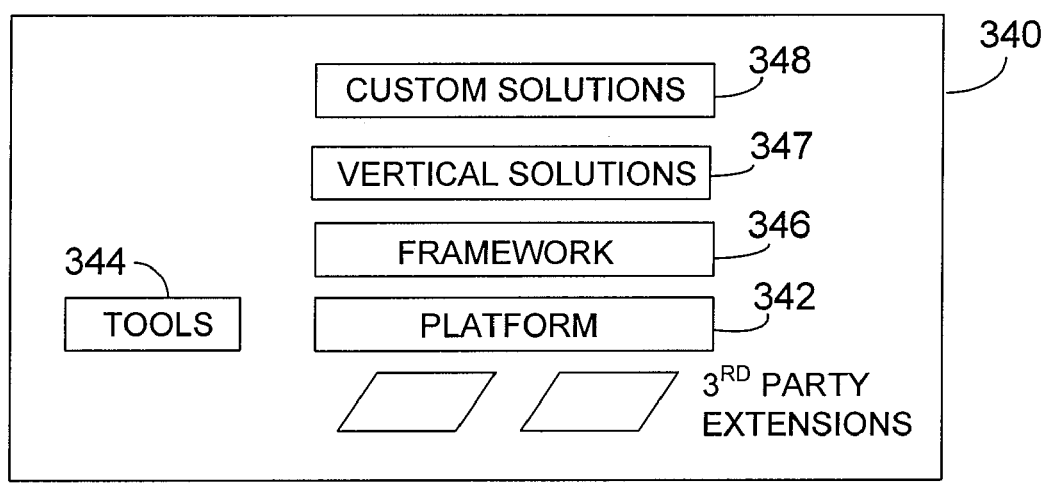

As shown in FIG. 7, the visibility system 340 includes a core platform 342 that is both easily configurable using tools 344 and easily extensible using frameworks 346. Specific systems (vertical solutions 347) that address vertical functions (such as finance, IT infrastructure, supply chain) and vertical industries (such as manufacturing, financial services, outsourcing, government) can be built on the visibility system. Custom solutions 348 can be built on the vertical solutions.

Application Stack

Figure 8:
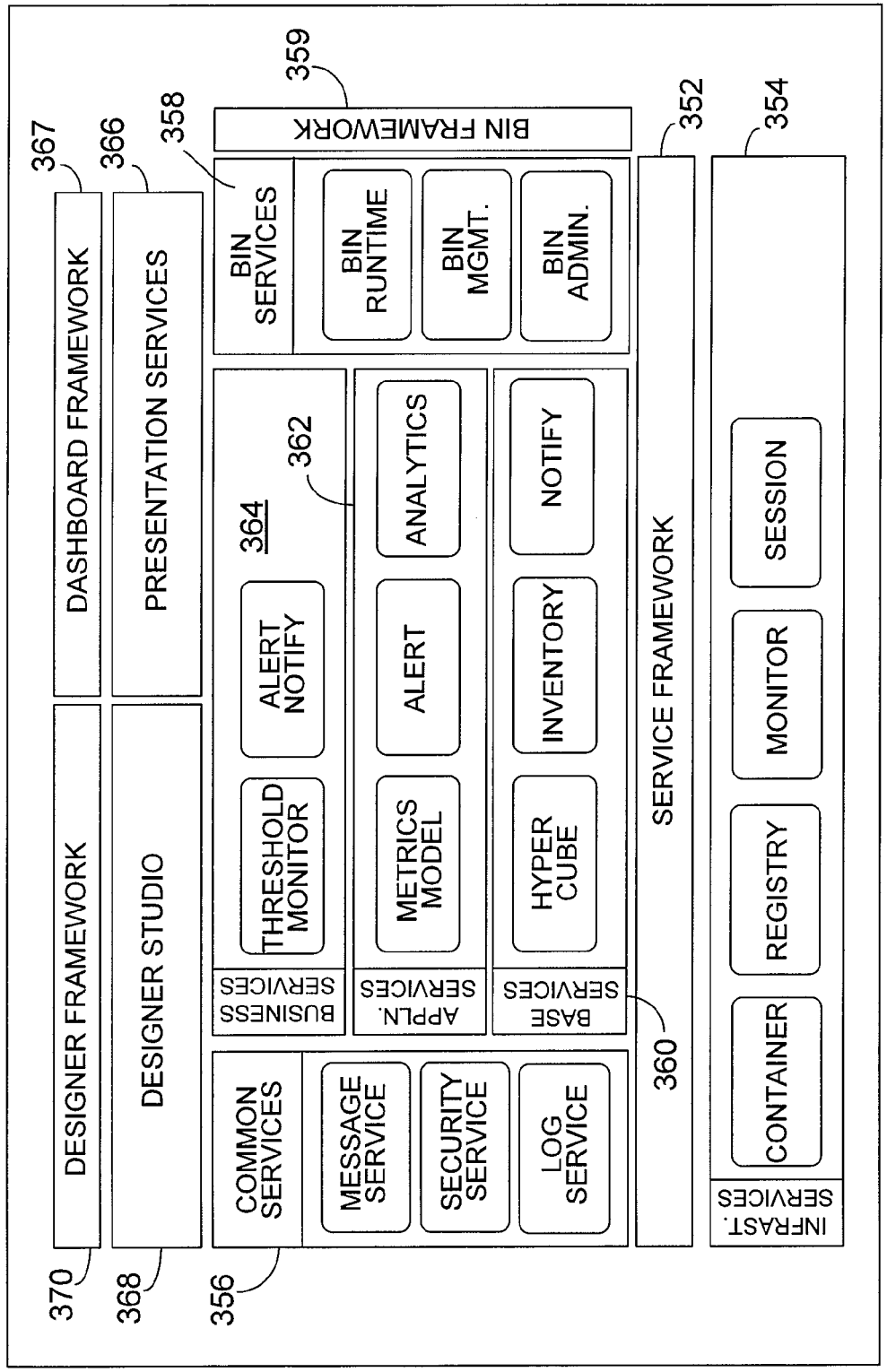

An example of an organization of services and frameworks in a visibility system is shown in FIG. 8. The core functions are built as a set of services that complies with a service framework 352. Services that offer platform functions are organized into three categories: infrastructure 354, common 356, and BIN 358 services (which are associated with a BIN framework 359). Services that offer business functions are organized into base 360, application 362, and business 364 services. Presentation services 366 are a set of services that collectively display the generated information to the end user in conformity with a dashboard framework 367. In addition to the set of services, a designer studio 368 operates in conformity with a designer framework 370. All backend tools are built using the designer framework and they are collectively hosted in the designer studio.

Each category of services is described in the table of FIG. 9.

Communication

Modes of communication supported by a visibility system may include a service-based mode in which a client of a service directly invokes the service (tightly-coupled), a message-based mode in which communication is indirect, by exchanging messages using a message service (loosely-coupled), and a network-based mode in which communication occurs by participation in a BIN (loosely coupled).

Any external communication (one that crosses the external boundary of the visibility system) generally uses network-based communication. Any internal communication (one that is confined to the visibility system) typically uses service-based and message-based communications. The upper layers of the system may also use network-based communication.

Service-Based Communication

Figure 10:
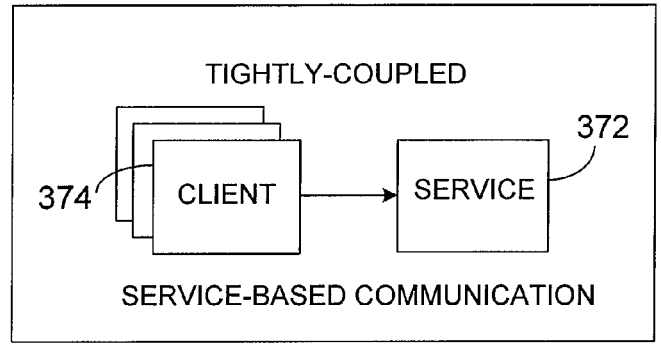

As shown in FIG. 10, in a service-based communication, a client 372 invokes a service 374. A client can be other services, for example, agents in a network, or presentation or designer code.

Figure 11:
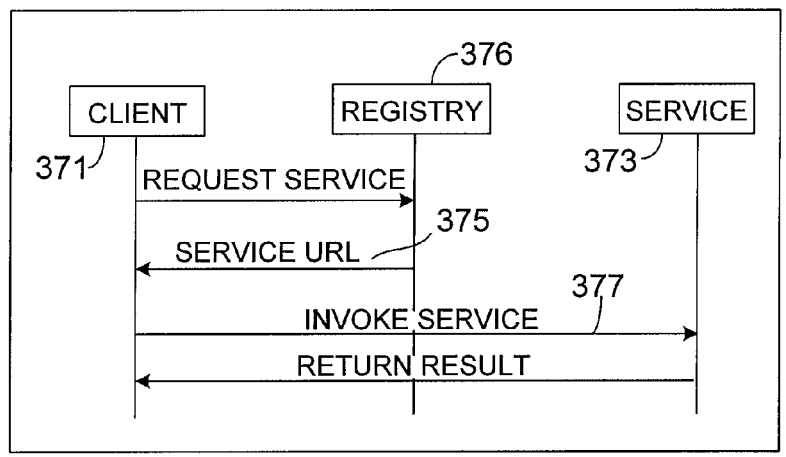

As shown in FIG. 11, a client 371 can access a service 373 directly by first obtaining the location of the service 375 from the service registry 376 and then invoking the service 377 at that location.

For internal clients of internal services, the details of invoking a service are shielded by a client framework. Every service provides a client library that makes it easy to use a service.

Message-Based Communication

Figure 12:
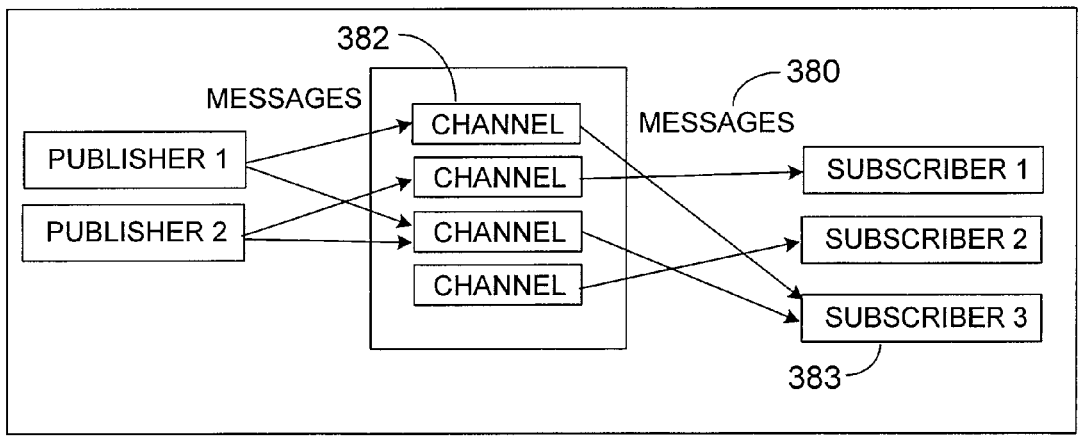
Figure 13:
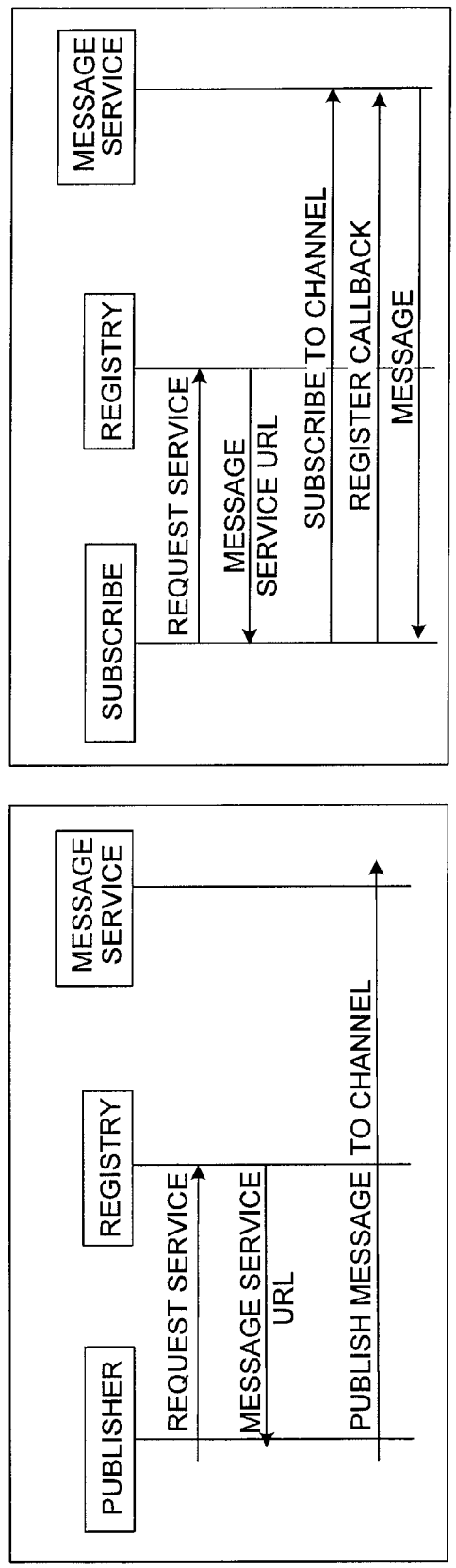

As shown in FIG. 12, any two modules can indirectly communicate with each other using a message service. The primary mechanism used to exchange messages is publish-subscribe. Through the message service, messages 380 are published to a channel 382. Any message published to a channel is received by all subscribers 383 to that channel. Examples of publication and subscription processes are illustrated in FIG. 13.

A message published to the message service follows a SOAP format and has a header and a body: SOAP message, SOAP header, SOAP body. The message service does not specify what the header and body should contain. The publisher and subscriber of a message must mutually understand the structure and semantics of the message.

Network-Based Communication

Figure 14:
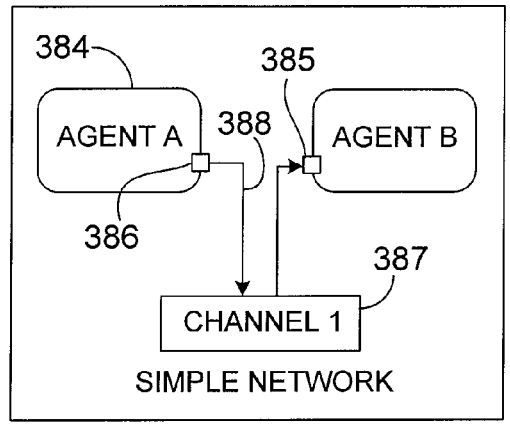

A shown in FIG. 14, the basic building blocks of a network are agents 384. Agents communicate by exchanging messages through their ports 385. They receive messages through their receive ports 385 and send messages through their send ports 386. Ports are linked to channels 387 through links 388. A send port connected to a channel sends messages to the channel and a receive port connected to a channel receives messages from the channel.

Figure 15:
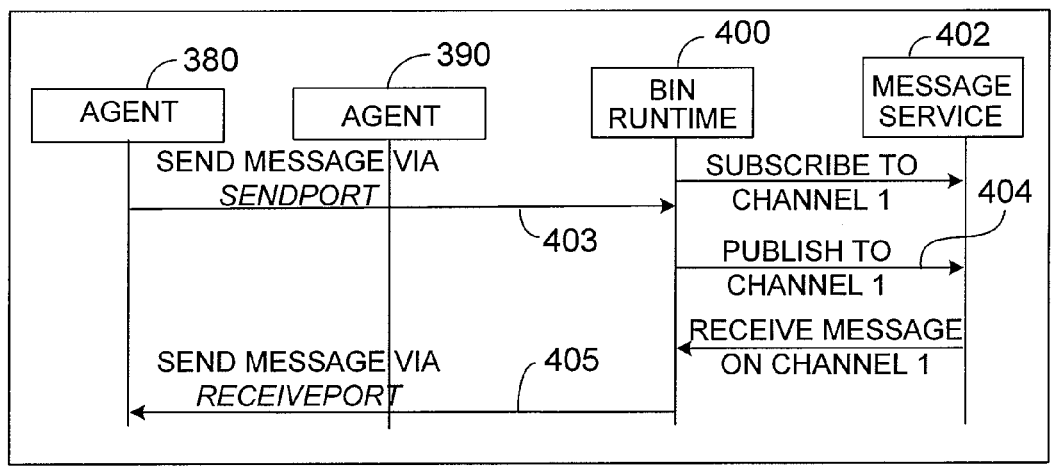

For example, as shown in FIG. 15, an agent 389 and an agent 390 connected through a channel 1 communicate with each other as follows. The network is hosted by a BIN runtime service 400 which implements the BIN framework. The BIN runtime internally uses a message service 402 for passing messages between agents. All channels in a network are directly mapped to corresponding channels in a message service. When an agent sends 403 a message through its send port, the BIN runtime captures the message and publishes it 404 to the corresponding channel in the message service. Likewise the BIN runtime subscribes to the channel connected to a receive port, captures any message received through the channel, and sends it 405 to the agent through its receive port.

One way to communicate is for an agent dropped in a BIN to become an active participant in a message-oriented communication. Agents can communicate by sending XML messages through their ports.

Another way to communicate uses the fact that all channels in a network are directly mapped to channels with the same name in the message service. This enables use of the message service by directly publishing or subscribing to channels in a network.

Messages

Messages that flow in a BIN are specialized SOAP messages called BIN messages. A BIN message has a richer definition of a SOAP header. Business content of the message is coded in the SOAP body as XML messages. It is left to the agents to define the schema for the message. An example BIN message is structured as shown below:

```
BIN message
    SOAP Header
        Message Id
        Correlation Id
        Sequence
            Id
            Number
            Count
        Context
            Security Context
                Ticket
                Principal
                Expiration Date time
            Locale Context
            Business Context
        Route History
            Route Info
                Network Element URI
                Timestamp
    SOAP Body
        Business Content
```

In this example, the message Id is a globally unique Id that identifies the message for logging and trouble shooting purposes. The correlation Id is used to correlate one or more messages and is used in a request-response mode of communication. The sequence Id and sequence number are used to a send a sequence of messages with a given order. All members of the sequence share the same Id and are numbered starting from 1. The sequence count gives the total number of messages in the sequence. At least one message in the sequence should define the value for count. A separate sequence Id is used instead of the correlation Id to allow for correlating multiple sequences. Message context consists of security context for security related information, locale context for locale related information, and any number of business contexts. Security and locale context are used by the framework and the business contexts are for the agents to transmit context information. The route history tracks the path through which a message was transmitted. It consists of a set of route info that contains the URI of the network element through which the message was passed and the timestamp at which the message arrived. BIN services that implement BIN framework will set the route history. The route history is used for tracking and trouble-shooting. The framework also uses the route history to detect message loops.

Figure 16:
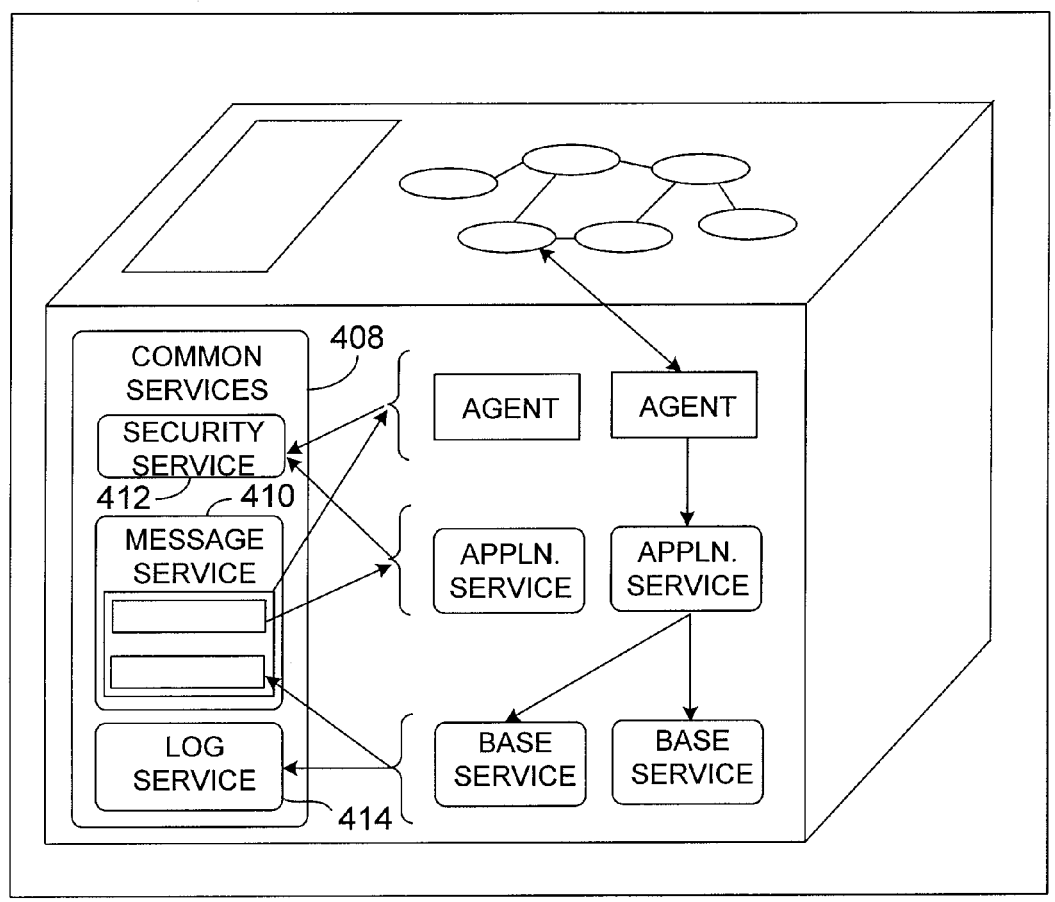

As shown in FIG. 16, all internal clients can access common services 408 (message service 410, security service 412, log service 414) by directly invoking them using their client library. Internal clients can be other services, agents, presentation services, and designers. A service can access other services but their dependencies are restricted by where they are placed in the service stack as shown in FIG. 15.

Services can publish messages to known channels. Any client can subscribe to these known channels and receive messages published on the channels. Well-known channels offered by common services are tabulated in FIG. 17.

Each service in base, application and business layers can also define well-known channels that other clients can subscribe to. Well-known channels are a good means to establish a loosely coupled communication between otherwise independent services. They are primarily used for synchronizing internal states of loosely coupled systems.

Any base service or application service can provide associated agents that can participate in a network. An agent enables a synchronous service to participate in an asynchronous network. But a base service or application service does not use network-based communication. The agents they provide will be used by other higher-level services. Business services, designer service, and presentation service can use network-based communication by publishing or subscribing to channels through the message service.

Log and security services are described in the table of FIG. 18.

External Communication

In some examples, there are two distinct interfaces for an external system to interface with a visibility system: an inbound interface where external systems like data sources are added to the system and an outbound interface where information generated by a visibility system is accessed by external systems. On the inbound side, any external system can become part of the visibility solution by the following methods.

As shown in FIG. 19, an external data source with a web service interface 416 can easily be dropped in a BIN using the standard web service proxy agent. Once dropped in a network their SOAP methods are invoked through their proxy agents.

Alternatively an interface with the network can be achieved by directly publishing to the channels using a message service 419. The message service has a web service interface through which external systems can publish messages.

In another approach, custom agents 421 may be written using the framework APIs. This method is useful in a situation in which you do not have a Web Service interface but have proprietary APIs to a data Source.

Messages published in external message buses can be received by the network.

Figure 20:
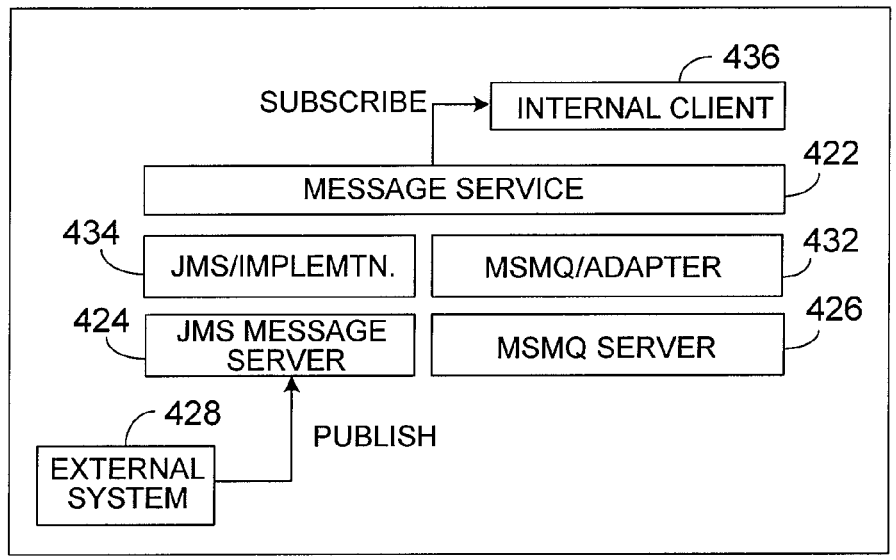

As shown in FIG. 20, The message service provides an abstraction to the underlying implementation of the service. The system can adapt to any external message bus (like MQSeries, JMS 424, 426) by implementing the message service interface. Any external system 428 can publish messages through the external bus and an internal client 430 can receive that message through the adapter 432, 434.

On the outbound side, any external system can extract processed information from the network as a web service using the web service publisher; by directly subscribing to channels using the message service; or through the message service's web service interface.

Communication Between Visibility Systems

Figure 21:
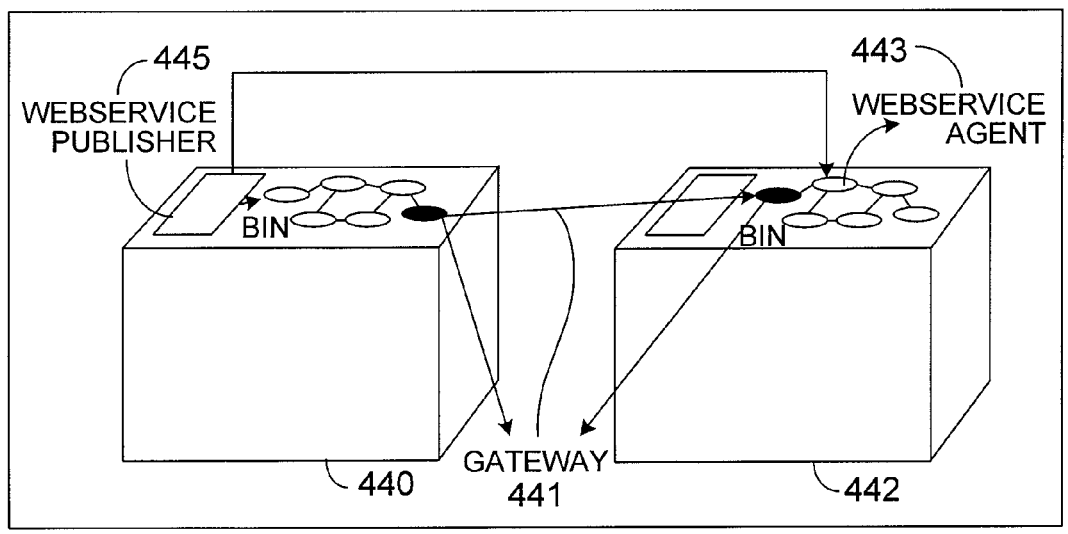

As shown in FIG. 21, all resources like services, network, metrics, and dashboards are visible only to other resources within the same logical installation. They are completely shielded from all other installations. Two installations 440, 442 can communicate with each other through a gateway 441 dropped in a BIN and exposed to the outside world, and by publishing a point 445 in the BIN as a web service made available to the outside world, and consuming the published web service through a web service proxy agent 434.

Framework Descriptions

The system offers four frameworks: dashboard and BIN, which are externally exposed, and service and designer, which are for internal use.

Every service has a definition part clearly separated from the implementation part. The definition part derives from the service interface to provide common functions for all services like start, stop.

Figure 22:
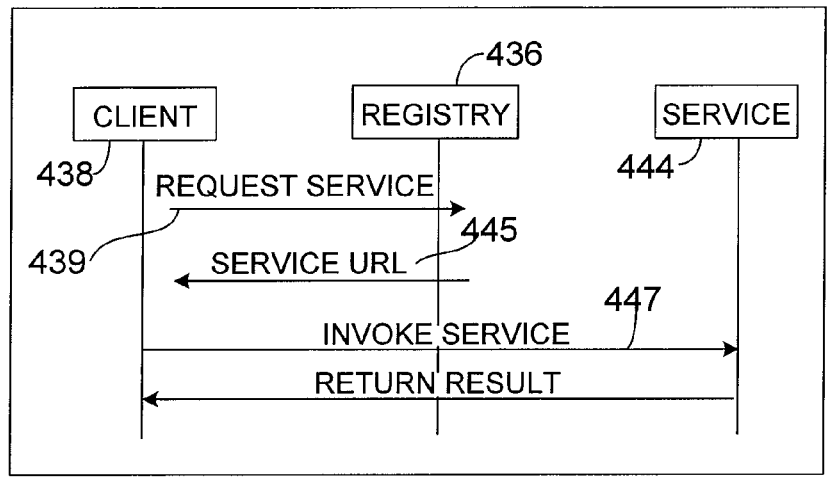

As shown in FIG. 22, once a service 444 is implemented, it is named using a hierarchical naming convention and is registered with the registry service 436. The registry service is a naming service that maps logical names of services to their physical locations.

Any client 438 that wants to invoke a service first makes a request 439 to the registry service to obtain the service URL 445 before it invokes the service 447.

Figure 23:
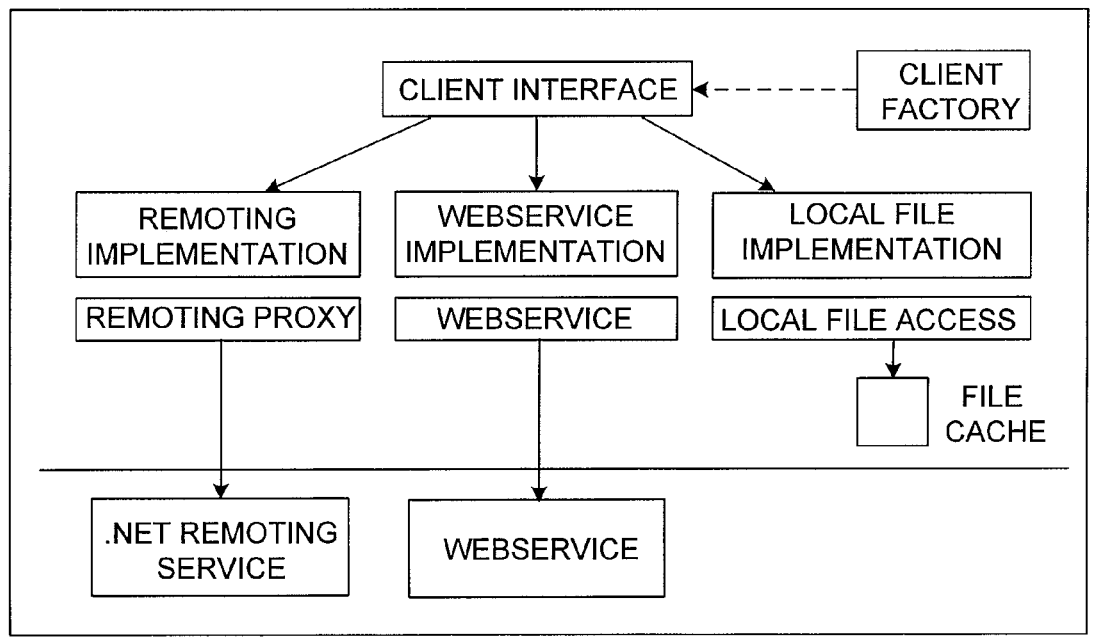
Figure 24:
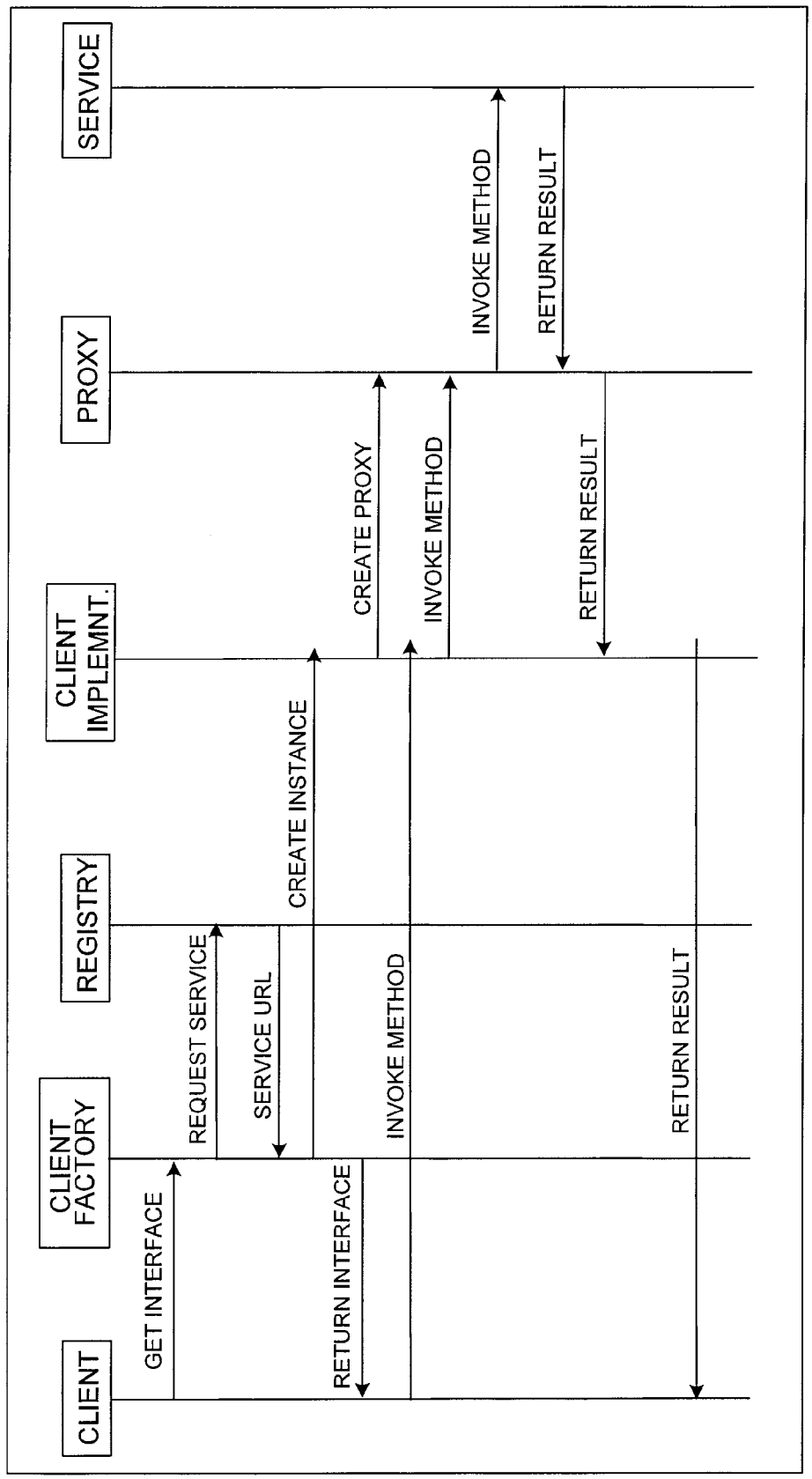

As shown in FIG. 23, in addition to the service framework, a client framework makes it easy for internal clients to access services. The sequence diagram of FIG. 24 illustrates service access using the client framework. (The portions of the figure that are grayed in the sequence diagram are shielded from the end client using the client framework.)

Designer Framework

Many services need design time information before they can be deployed at runtime. The visibility designer offers an integrated environment where design time tools are available. The designer may be implemented in a rich-client architecture that is a compromise of windows-based fat clients and browser-based thin clients. Rich clients are developed as a three-tier architecture with a service as a middle tier. This architecture eliminates the need for a client-side install but provides a rich user interface that is available outside the firewall.

BIN Framework Details

Figure 25:
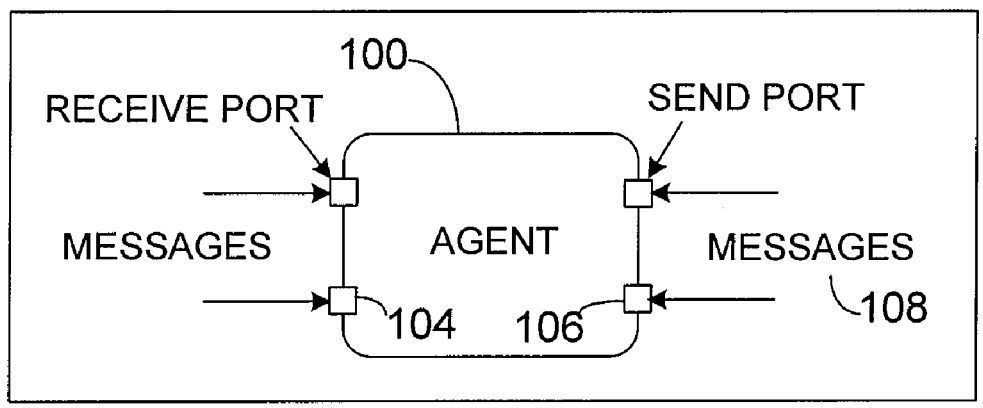

As shown in FIG. 25, an example agent 100 is a process component that performs dedicated or specialized functions and produces and/or consumes business entities. An agent has one or more ports 104, 106 through which it communicates with the external world. In this example, a port is one-directional and can either be a receive port 104 or a send port 106. Agents are highly reusable as process components in part because they are unaware of other agents or how they are used. Any kind of web service can be included in a network using an agent whose function is to act as a proxy for the web service.

A business entity is, for example, modeled as an XML message 108 and embodies abstract business information, that is, information about the enterprise. When a business entity flows through the network, it is embedded in the body of a SOAP (Simple Object Access Protocol) message and transported through the channels of the network. Other information, including context and routing information, are added to the header of the SOAP message.

Figure 26:
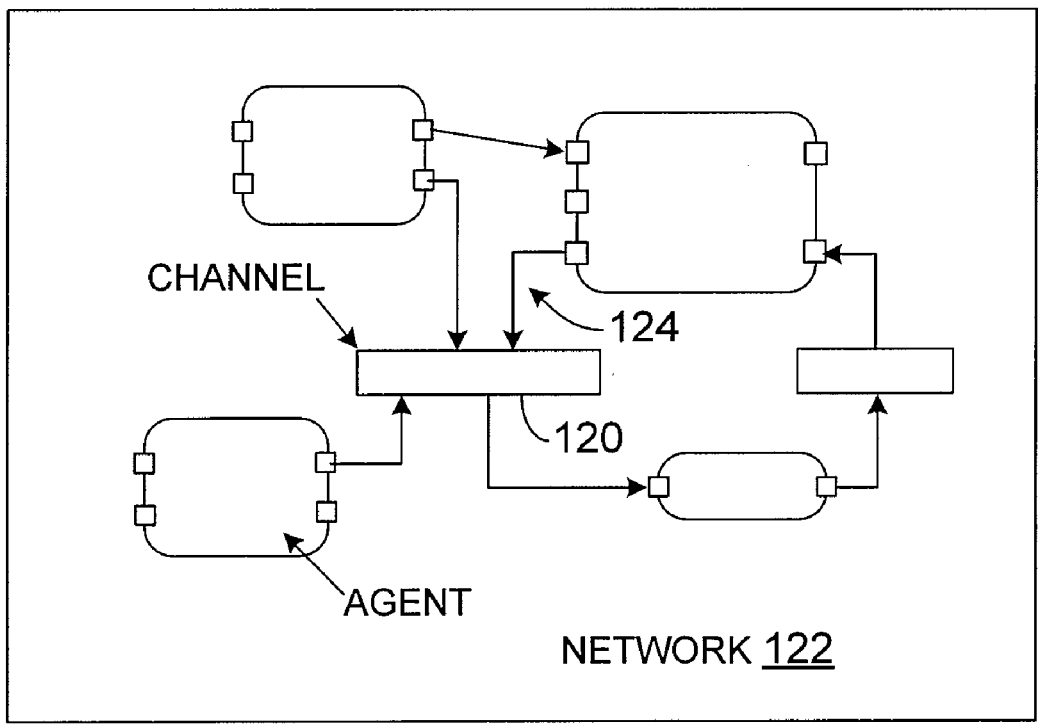

As shown in FIG. 26, an example channel 120 is a conduit for business entities. Agent ports are connected to channels. Agent send ports connected to a channel publish business entities to the channel and agent receive ports connected to a channel receive business entities from the channel.

A network 122 is built by connecting one or more agents through channels. Agents are connected to channels through links 124. A link connects an agent port to a channel. The purpose of building a network is to generate useful business entities. Business entities are said to flow through the network and the agents participating in a network can either produce or consume business entities through their send and receive ports, respectively.

Figure 27:
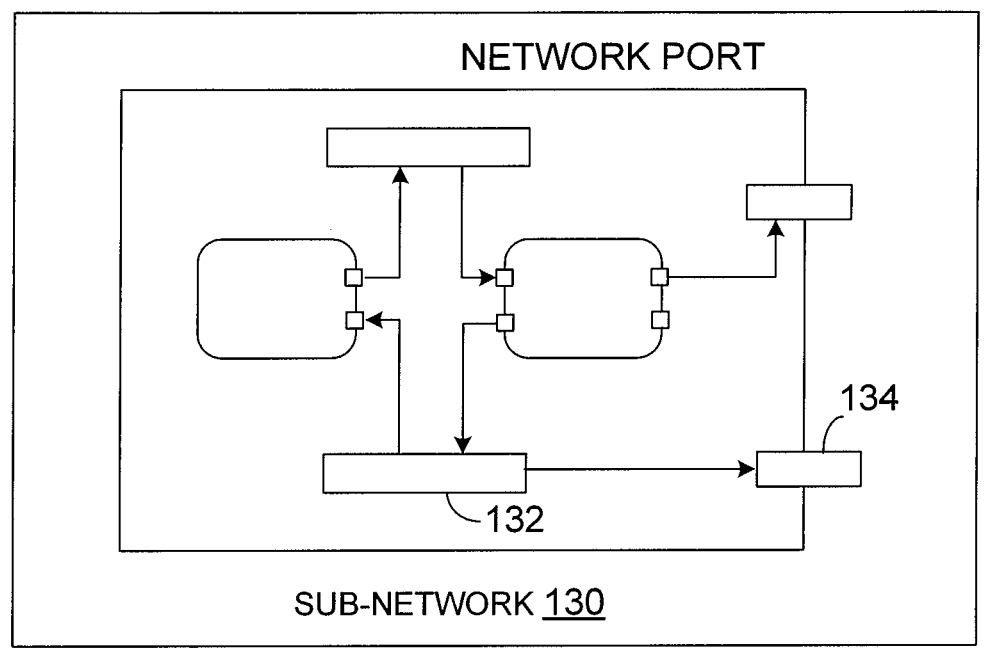
Figure 28:
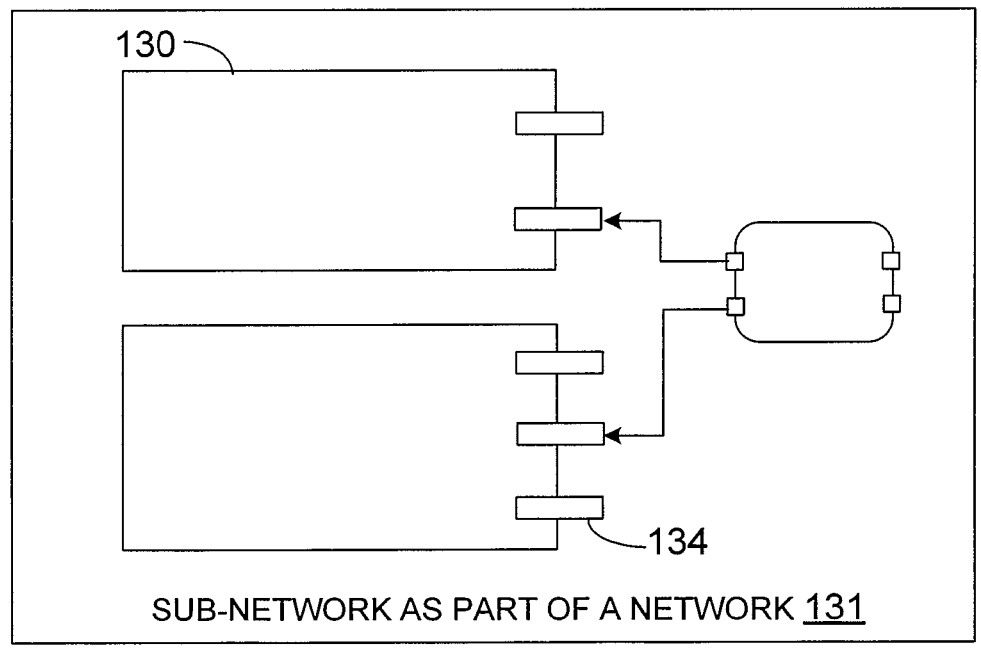

As shown in FIGS. 27 and 28, an example network can be divided into sub-networks 130 and sub-networks can be connected together to build a network 131. Multiple layers of network hierarchy are permitted (but not shown in the figures). A sub-network is reusable in any number of networks. Channels in a sub-network can either be private 132 or public 134. Messages flowing through private channels are available only to other agents in the same sub-network. Public channels are accessible to the network that contains the sub-network. When a sub-network is a part of another sub-network, the public channels of the inner sub-network become private channels of the outer sub-network.

Figure 29:
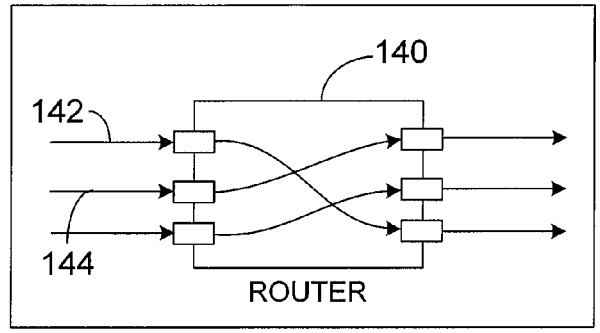

As shown in FIG. 29, an example router 140 provides the capability to route messages in a network. It brings a set of channels 142, 144 together and routes messages from one channel to the other. Routing can be statically based on the channels connected to the router or dynamically determined based on the content of the XML message.

A hub is a specialized router that has one input channel and multiple output channels. Messages sent to the input channel are sent to all the output channels. Any agent connected to the input channel through its send port can send messages to all the agents connected to the output channels of the hub. Likewise any agent connected to the input channel through the receive port will receive messages sent by all the agents connected to the output channels.

Figure 30:
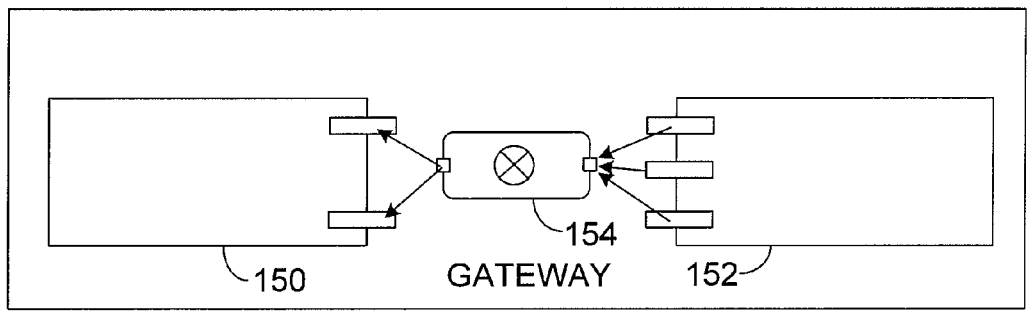

An example gateway 154, shown in FIG. 30, has one input port 150 and one output port 152 and provides filtering and transformation of XML data before forwarding to the output channel. Gateways are useful to connect two sub-networks and control the flow of messages between the sub-networks.

Figure 31:
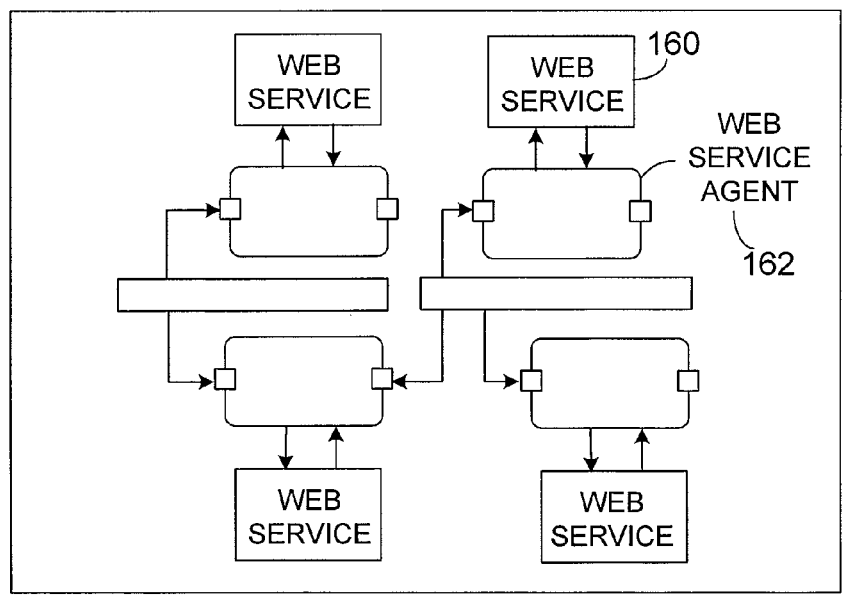

As shown in FIG. 31, an example web service 160 can be dropped as a node in the network through an agent proxy 162. An agent proxy converts a synchronous, pull-based web service into a node that can asynchronously participate in both push-based and pull-based communications.

The Hypercube Model

Figure 48:
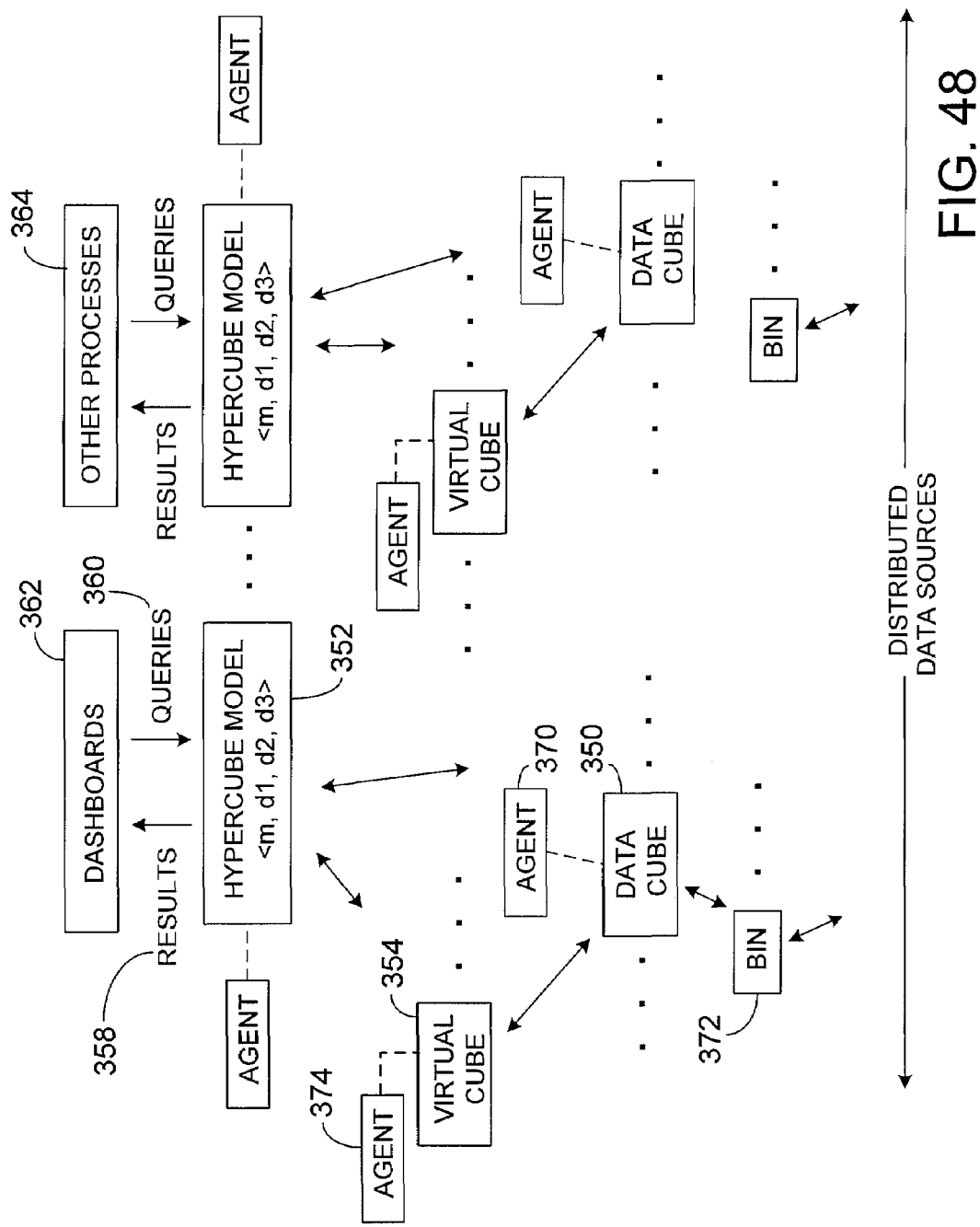

As shown in FIG. 48, data that is accumulated and used in the system is stored in the form of data cubes 350 that conform to one or more hypercube models 352, which are part of the modeling layer of the system. A hypercube model is a multidimensional cube that models one or more measures or metrics m against multidimensional enterprise data $d1$, $d2$, $d3$, .... Metrics or measures reflect the business management model of the enterprise and capture the relationship between the management metrics and the underlying data. The hypercube model forms the basis for other cubes in the system including data cubes and virtual cubes 354, both of which inherit properties of the hypercube.

The hypercube model is used to supply management information (results 358) in response to queries (360) received, for example, from dashboards 362 (which present the management information to users) or other processes 364. For the model to respond to queries with the required results, a hypercube agent receives the query and applies the hypercube model by invoking one or more data cubes, either directly, or indirectly through one or more virtual cubes.

The data cubes are served by data cube agents 370 that store the actual data (current data accumulated from distributed parts of the system, or values of metrics that are derived from the current data in conformity with the hypercube model). Data cube agents also serve to make the data available when a query is being answered. The current data stored in the data cubes is obtained from distributed sources of the enterprise using the agents and BINs 372 that process the current data as needed.

Alternatively, the data can be obtained indirectly from the data cubes using of one or more virtual cubes 354 that store meta data in a manner that conforms to the hypercube model. The virtual cubes are served by virtual cube agents 374 that store the metadata in the cube and use the metadata to assist in responding to queries by fetching the current data from the data cubes.

The virtual cube metadata identifies the locations (for example, the locations in one or more data cubes) at which are stored the values of the data components and the metrics derived from them. The virtual cube metadata does not contain the data values themselves but only pointers to where the values can be found.

The virtual cube can point to and derive data from many data cubes. A query may be decomposed as needed to point to the data cubes that have the actual current information. Each data cube returns its portion of the current data needed to respond to the query. The data is then assembled by the virtual cube's engine and becomes the current result set for the query.

A common language is used to express the data or metadata that is stored in the data cubes and virtual cubes and also the model information stored in the hypercube model.

A dashboard designer uses a common query language to embed queries in the dashboard. Because of the common query language, it is easy to add, change, and supplement queries in a dashboard and to create new dashboards as the enterprise and its business model change. The management information to be provided to users of dashboards typically entails the metrics that based on current data, for example, revenues by region for a given product.

The virtual cube and the data cube hold only meta data and data; they do not contain processes. The hypercube contains only expressions of modeled metrics. Processes needed to execute queries are contained in analysis services.

At run time, the queries are applied to the hypercube model and the management information is delivered based on data received from the data cubes. In effect the hypercube serves as an access mechanism from the dashboards to network-processed data.

In some example, the query language may be similar to the xquery language applicable to XML with extensions to include functions of the mdx query language. The language enables functions such as aggregation, slicing, and dicing of data.

The dimensions of the multidimensional data may represent, for example, products in a product line, or regions in a market, or time, or identities of sales people.

The data cube or cubes in the system are able to consume events, that is, they may be updated to reflect changes in current data that are expressed as events. When data or metadata is updated in a data cube or a virtual cube, the updates themselves may produce additional events in the system.

The system can have more than one hypercube model. A cube may be transient or kept in memory. A cube may be streamable from one point to another.

A virtual cube is able to provide its own meta data upon request.

A cube has additional attributes for characterization at the domain level, including a timestamp, a place of origin, an indication of ownership, and a indication of accuracy.

BIN Patterns

The topology of an enterprise-wide BIN will vary from enterprise to enterprise based on information needs of the enterprise and the nature of the distributed external data sources (or repositories) that belong to the repository or to which it has access. Sometimes the pattern of the components belonging to a BIN make the BIN suitable for reuse repeatedly as a sub-network in building complex networks.

Figure 32:
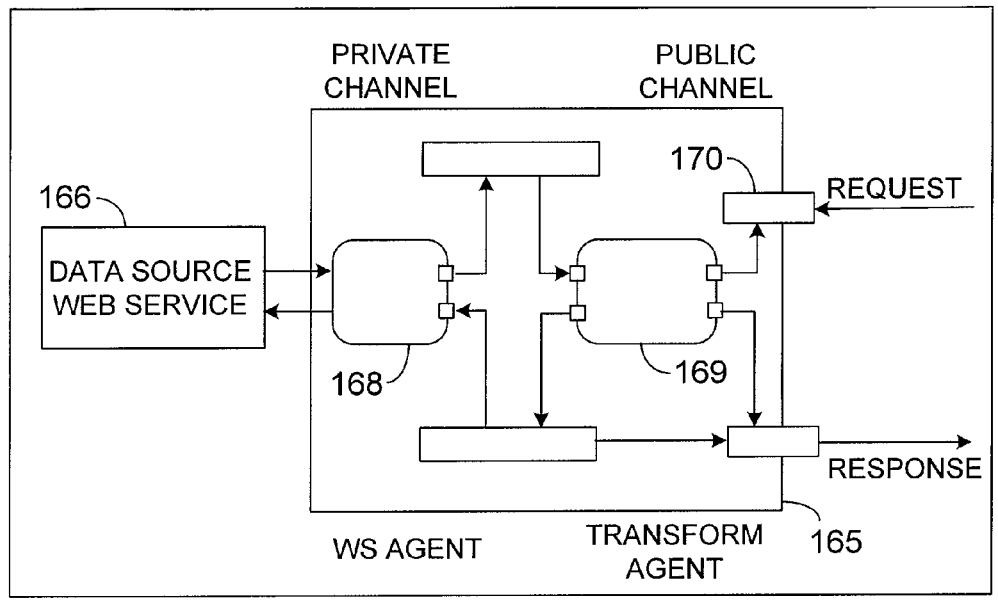

As shown in FIG. 32, one simple such pattern, called an extract-and-transform BIN 165, extracts information from a data source or web service 166 using a web service agent 168, performs a transformation using a transform agent 169, and makes the information available for immediate consumption on public channels 170. Extract-and-transform BINs can be directly used for just-in-time information retrieval or indirectly used as sub-networks in other BINs.

Different data sources can be served by corresponding specialized extract-and-transform BINs and several such BINs can be used in an assembly network to produce information aggregated from multiple separate sources, including sources for which the data has formal and temporal inconsistencies.

Figure 33:
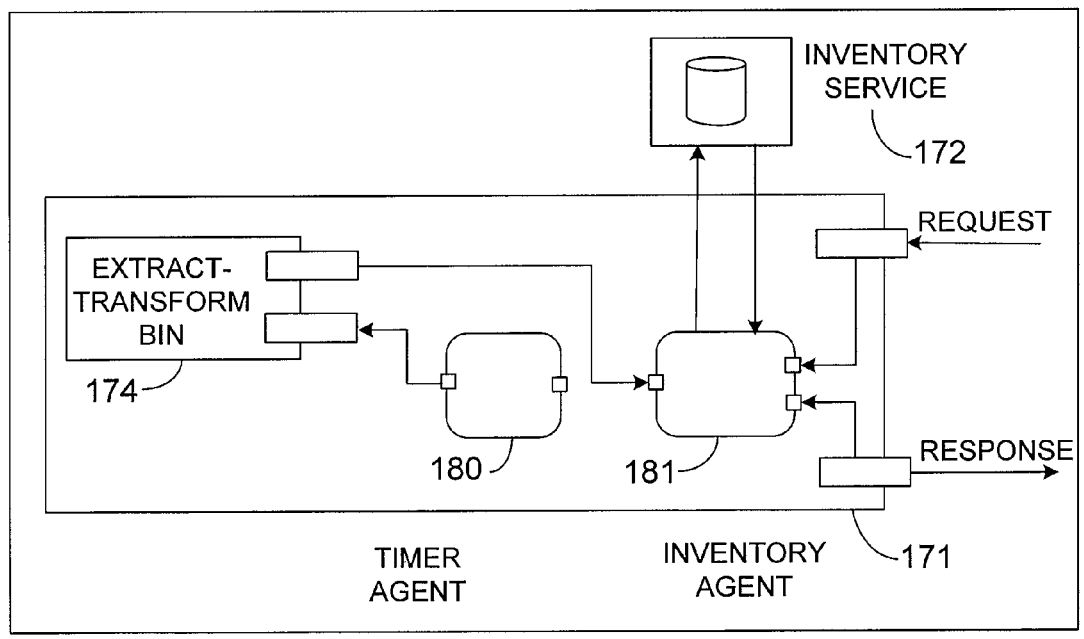

As shown in FIG. 33, another example of a BIN pattern 171, called hold-and-retrieve, enables enterprise information to be held in an inventory 172 for later use. A hold-and-retrieve pattern may store information from external data sources (not shown, but served by the extract-and-transform BIN 174) that cannot be accessed frequently or to store analyzed information that is expensive to process, or to store real-time events for later consumption. This pattern is normally used in conjunction with other BINs, like extract-and-transform or assembly networks.

In the example shown in FIG. 33, a timer agent 180 (or other external trigger) is used to trigger the extract-and-transform sub-network and the resulting information is stored in the inventory using an inventory agent 181. When information is requested it is retrieved from the inventory through the inventory agent.

FIG. 34 shows a store-and-analyze pattern 182 that stores information received (say from an extract-transform BIN 184) in a structured hyper-cube 186 through a hyper-cube agent. The hyper-cube stores information in a structure that is suitable for information analysis. Specialized agents called analysts 188 work on the structured information and produce analyzed information. The analyzed information can be consumed immediately, stored back in the hyper-cube 190 or sent to a hold-and-retrieve BIN 191.

FIG. 35 shows a service-tier, or S-tier pattern 192 used to create tiers of services by controlling the flow of messages between tiers. A tier can be viewed as a set of services that participate in a peer-to-peer network. Services 194 participating in any tier 196 are free to exchange messages with their peers in the same tier but are restricted from exchanging messages with the tier below 198 and the tier above 200. Gateways and routers can be used to control the flow of messages between tiers.

One use of service tiers is to group agents according to the functions they perform in three tiers called a data tier, an information tier, and a metrics tier. Agents participating in the data tier are specialized agents called data brokers that retrieve data from external data sources or receive events from external systems. In the middle tier, specialized agents called assemblers assemble or create information that is formally and temporally consistent across all data sources. In the top tier called the metrics tier, specialized agents called analysts analyze the information generated by the information tier and produce consumable metrics, for example, numbers about the current or future state of the enterprise that can be used by managers. In each of the tiers, the various BIN patterns described earlier can be used, for example, extract-and-transform BINs in the data tier, hold-and-retrieve BINs in the information tier, and store-and-analyze BINs in the metrics tier.

As shown in FIG. 36, a message island 210 is a BIN pattern that exchanges information that is geographically distributed. Each geographical location is modeled as a message island 212, 214 and information exchange between islands is controlled through gateways 216. This BIN pattern is easily implemented using sub-networks in which private channels are used to create message islands.

Figure 37:
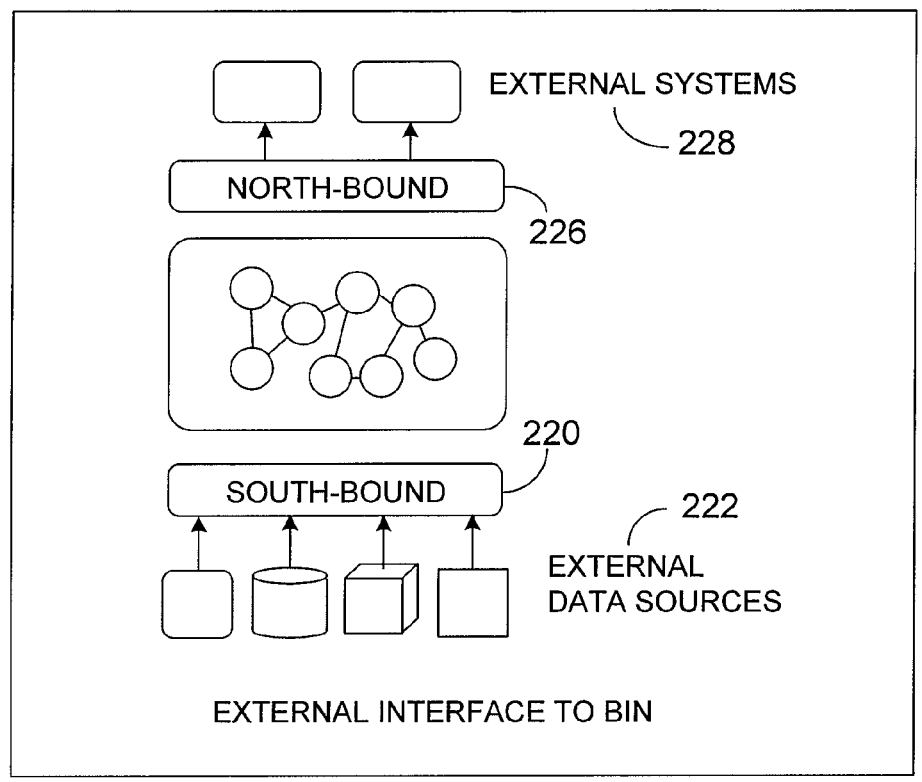

FIG. 37 shows the two ways in which an external system may interface with a BIN. One, called the south-bound interface 220 adds the external systems, such as data sources 222, to the network. In the other, called north-bound 226, the information generated by the network is accessed by external systems 228.

On the south-bound side, any external system can become part of a BIN in several ways.

An external data source with a web service interface can be dropped in a BIN using a web service agent. Once dropped in a network, the source's SOAP methods are invoked through their proxy agents.

In a publish-subscribe to channels approach, the interface with the network is achieved by directly accessing the channels. Publishing or subscribing to channels is done using the message service which offers a standard SOAP interface.

Alternatively, standard agents may be used to extract information from standard sources like SQL databases, Excel spreadsheets, and flat files. If a data source can be accessed from one of these agents, it can be added to the network.

Finally a custom agent can be written using the framework APIs, which is useful if there is no web service interface but there are proprietary APIs to a data source.

On the north-bound side, an external system can extract processed information from the network by configuring a custom web service interface to access any information generated by any part of the BIN or by a publish-subscribe to channels that permits extracting information from the network by directly accessing the channels through the SOAP message service.

The BIN offers a rich framework to model any complex information system. In a BIN, agents are interconnected as nodes in a network and agents asynchronously exchange SOAP messages. A BIN can be used directly or as a part of other BINs. A complex information system can be broken down into reusable BINs that are easy to create and maintain. The topology of an enterprise-wide BIN will depend on the information needs of an enterprise and available data sources. BIN patterns can be used as building blocks to build more sophisticated information systems.

Process Architecture

A system built using BINs is a message-oriented distributed system and, thus, is location and implementation independent.

Figure 38:
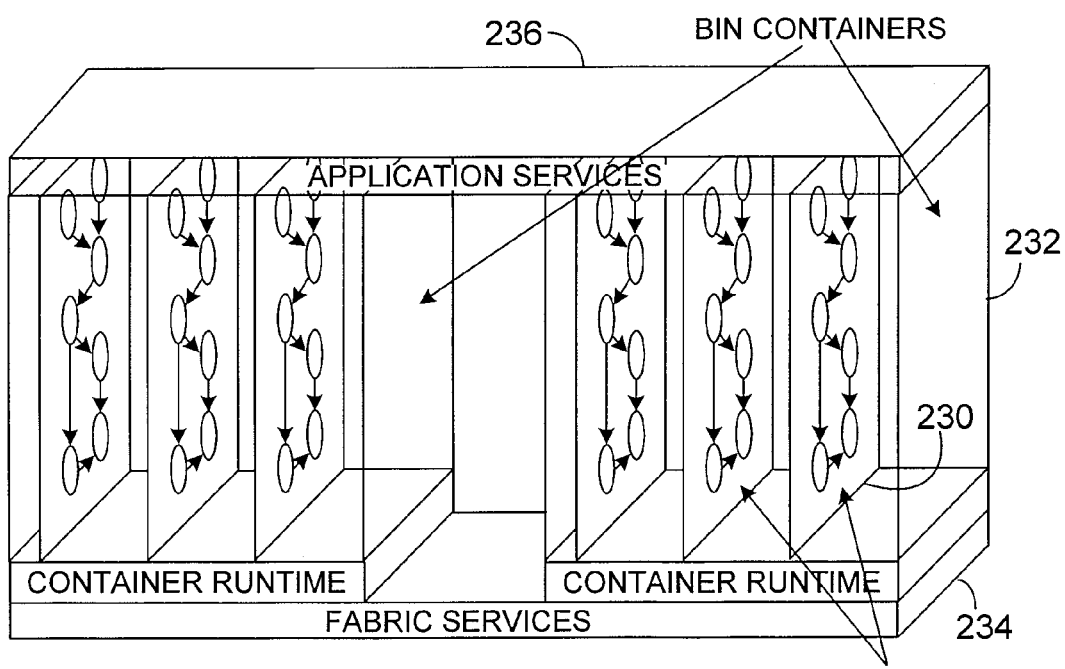

As shown in FIG. 38, BIN's 230 are deployed in BIN containers 232, which provide the runtime environment for the BINs. BINs are interconnected through message bus devices, such as routers, gateways, and channels as described earlier. BIN containers in turn are hosted under CLR-compliant (Common Language Runtime) processes 234 to provide an operating system level of services. In an alternative implementation the BIN containers could be hosted under a JVM (Java Virtual Machine) environment.

One or more application services 236 use the current information that is generated by the BINs in order to provide high level services, for example, metrics modeling and alert modeling.

Figure 39:
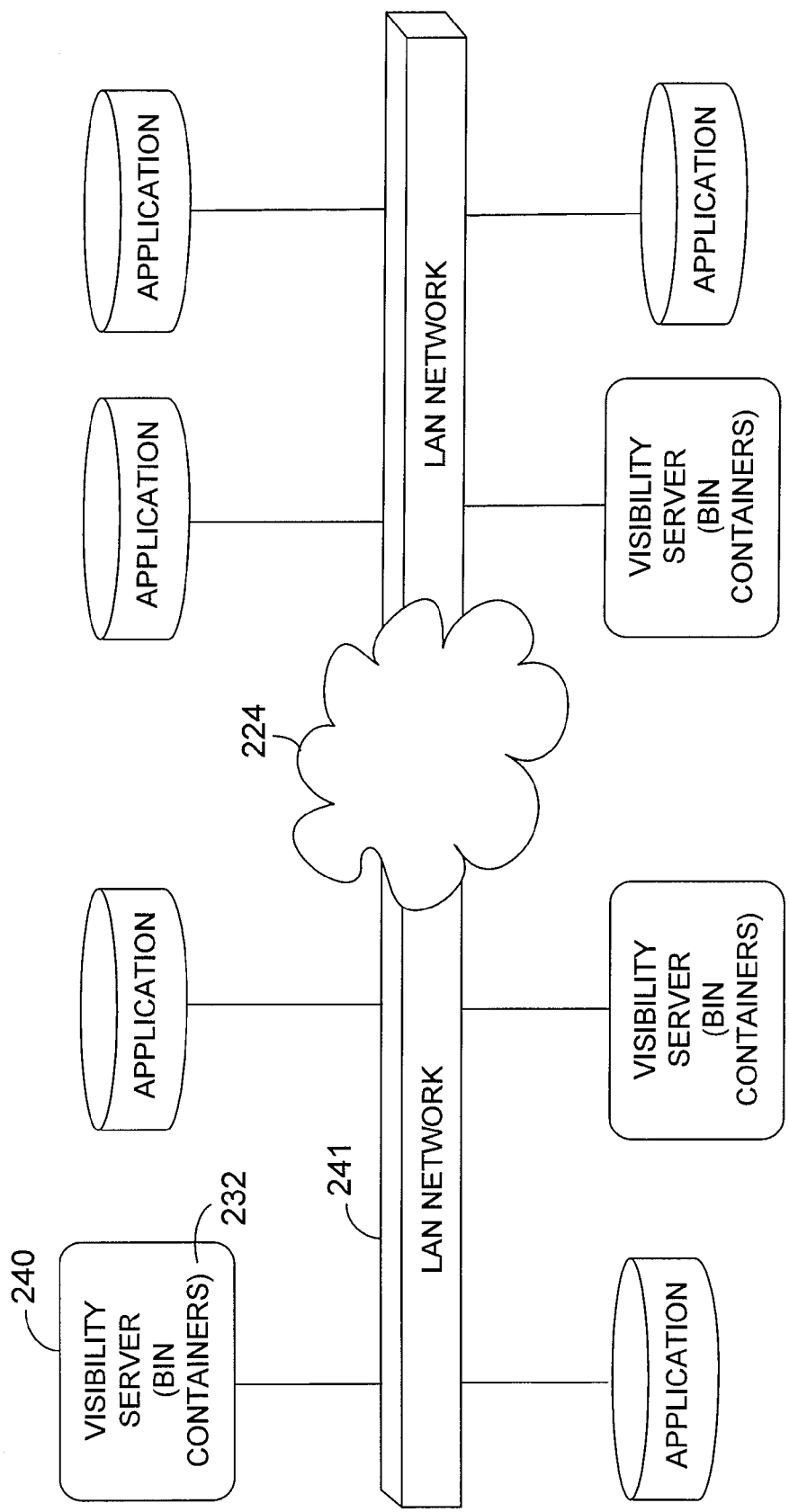

As shown in FIG. 39, in a physical implementation of an enterprise information provisioning system, BIN containers 232 are deployed on multiple machines in so-called visibility servers 240 on local area networks (LANs) 241 that may also be linked through a wider network 244. In the visibility system 242, the agents (the agents previously described) consume and generate SOAP events, which flow through a message bus. The business process model depends on the network configuration. Each agent is immune to its inflow generators and outflow consumers.

Requests for service are posted on network channels or published agent web services. A request can be posted using a publish-subscribe mode or a point-to-point mode.

Requestor credentials are the security context between the requester and the network. If the network fails to validate the credentials, the request is terminated with an appropriate exception and a security warning. A requestor can demand a response in various ways: on a private channel as an asynchronous event; in a manner determined by the network; or as a synchronous web service response using a SOAP event. If the response is not a web service response, the requestor can identify a private channel or pre existing channel in the network on which the response is expected by the requestor. If this information is missing, the response is published on a pre determined channel and the requestor is expected to know the identity of that channel. In case of point-to-point communication, the response channel can be predefined. A request message is the body of the request. As an option, a requestor can demand the response in a particular format. Depending upon the network capabilities, the template may or may not be honored by the system. As an option, a requestor may register the exception handler as channel or web service callback method. In all cases of exception, the response contains a built-in exception as part of the event header. Optionally, the requestor can provide a request expiration age, in case a response is not ready instantaneously. If the response is late, the network discards the request and releases all the associated resources.

Figure 40:
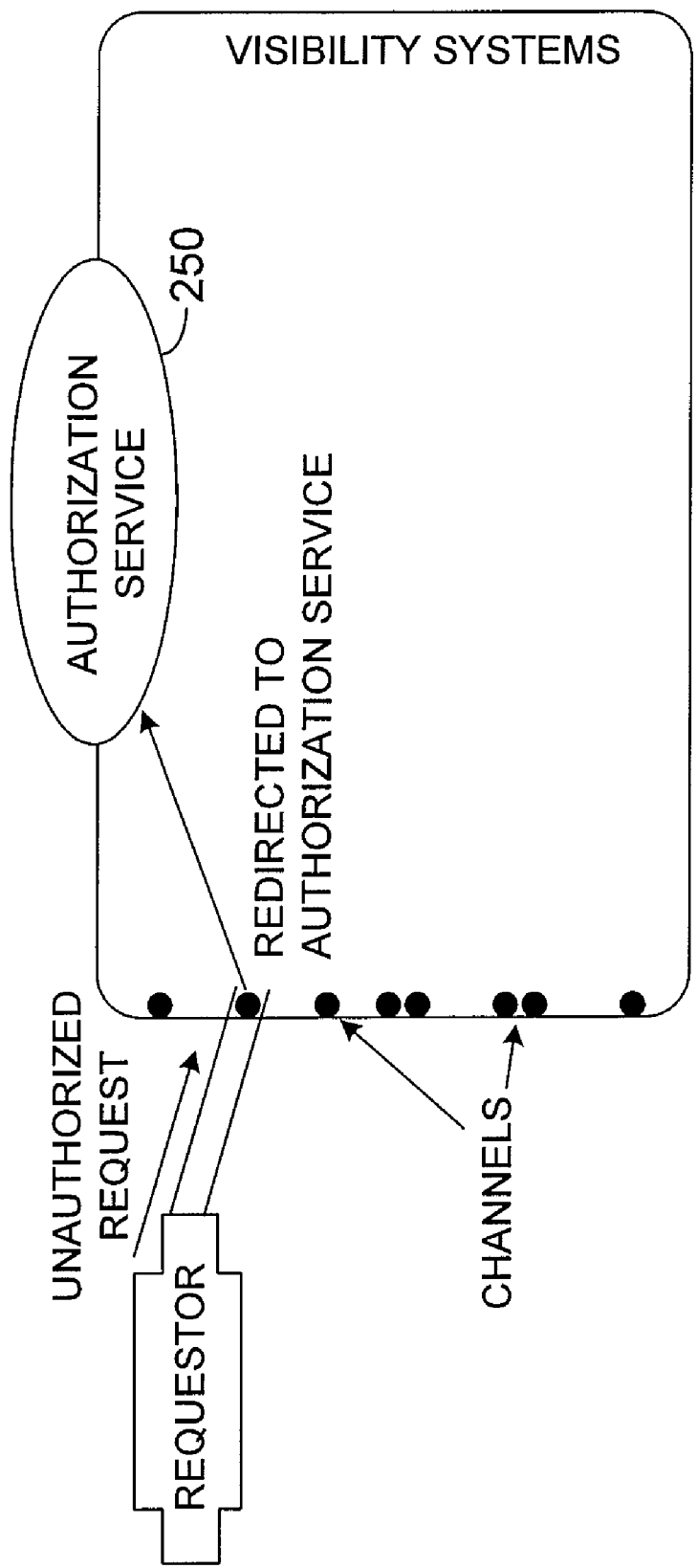

If a requestor makes a request for which the credentials don't match, the request is redirected to an authorization service 250 (FIG. 40). The authorization service can take one of the following steps: (a) reject the request and send it back to the requestor with an appropriate response with exception, (b) try to revalidate the credentials, if present in the request, with its session log and, if successful, redirect the request back to the original redirector, otherwise follow step a, or (c) if credentials are missing, but request has user information, authorize the user and authorization information; if successful, provide the new credentials, add the credentials into the request and send it back to the original redirector for further processing.

If a request has already been authorized and the credentials are matched with the current session, the request gets accepted. The credentials validation can be offloaded to authorization services as described in the last section. By pushing the credentials validation on the container level, the internal flow of events does not go through the same revalidation. To improve the performance, the container may cache credential information in the context to avoid validation for every request from the same requestor.

Figure 41:
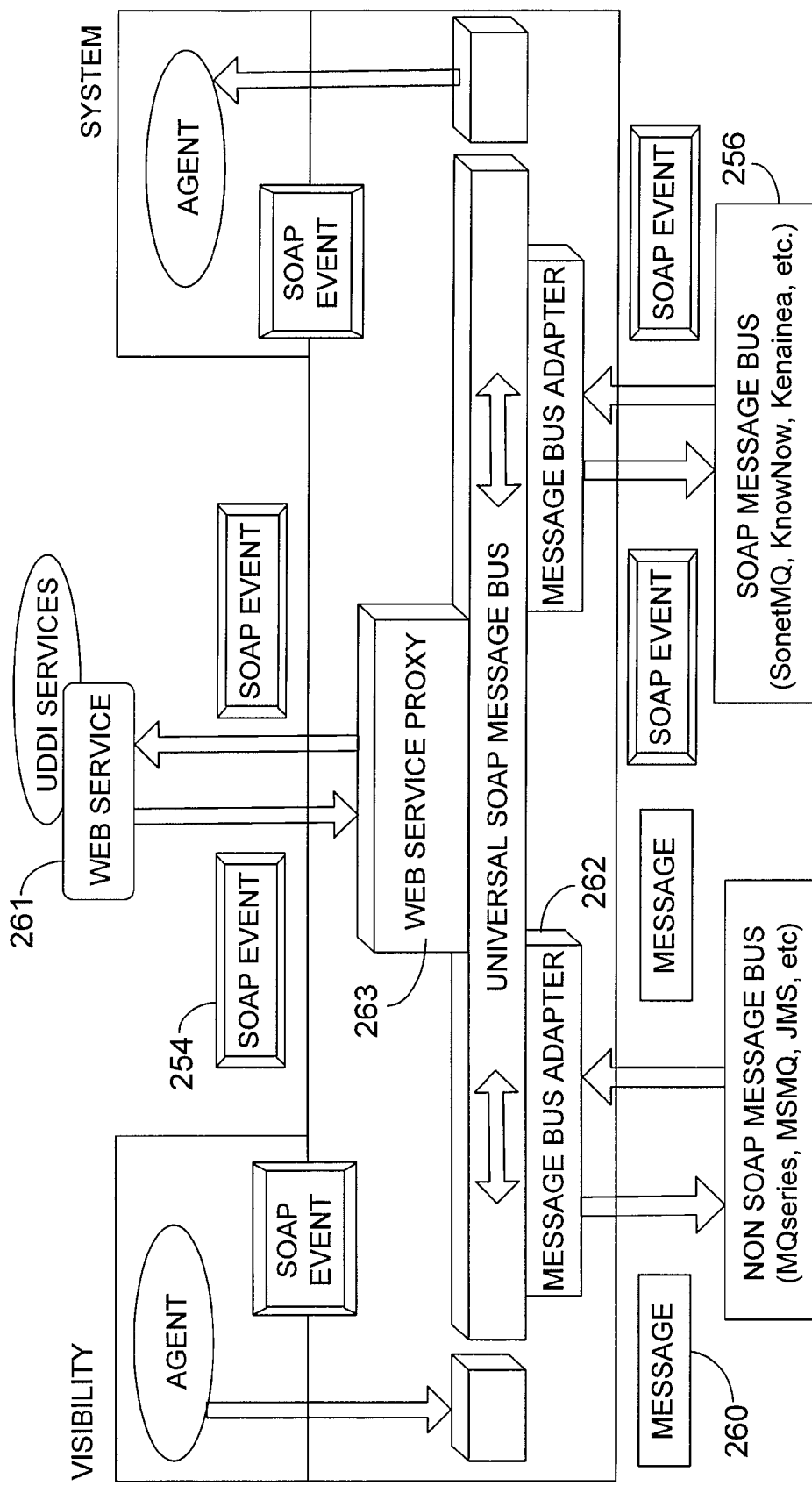

As shown in FIG. 41, in accordance with a message model, messages flow as SOAP events 254. Messages are expressed as XML messages. If a message is encrypted, the appropriate keys are part of the message header as SOAP header. The system operates with external message buses, including SOAP message buses 256 and non-SOAP message buses 258, messages 260 may be published to the non-SOAP buses for external native systems to consume these messages. For messages 260 that are not in the format of SOAP events, a message bus adapter 262 creates the SOAP wrapper on the message. Similarly, when a message goes out of the system and gets posted on a native message bus, any mismatch can be taken care by the adapter code.

Mapping rules between system channels and external message bus channels are maintained by the network configuration.

Web services 261 are integrated into the system through a web service proxy 263, which converts communications that conform to a request-response model to communications that conform to a publish-subscribe (point-to-point) model.

The system can pull data from external systems that have defined web service interfaces. The system goes through web service brokers to extract the data by invoking the appropriate web service interface. Web service brokers go through web service proxies, which transform publish-subscribe communication protocol for web service brokers to request-response protocol for the data source web service. This model is based on data on demand and brokers may optimize the pull frequency on the basis of data source characterization and local caching.

A push model can be used for more sophisticated type of data sources, which allow trigger insertions. Under this model, a data source can be configured to send incremental data to the network. The data broker receives the data and routes to an appropriate channel. Here again, the web service proxy does the transformation from request-response protocol to the publish-subscribe protocol. The data source can also push the data through the EAI (enterprise application integration) bus.

In an event-based model, the system can subscribe to external event suppliers to receive the events. A message receiver provides a web service interface for being called for new events. If the event supplier is not a web service, an event consumer provides its proxy to convert the native protocol to a web service protocol.

In terms of a distribution model, the system is a logical container for a network of services. The BIN container hosts all or part of the network of services. The BIN container provides fabric services to the application services. BIN containers can be deployed on single or multiple machines. Multiple containers talk through the message bus, which is exposed by fabric services. The system provides a single point of administration to deploy and administer the services. The system can be distributed across multiple physical locations. Two locations are connected through a gateway. The gateway provides the filtering of messages and mapping into the message bus topics.

The system process model is dependent on the network design and the network devices. The system avoids any single point of congestion of data and management by virtue of the distributed model.

Application Architecture

Figure 42:
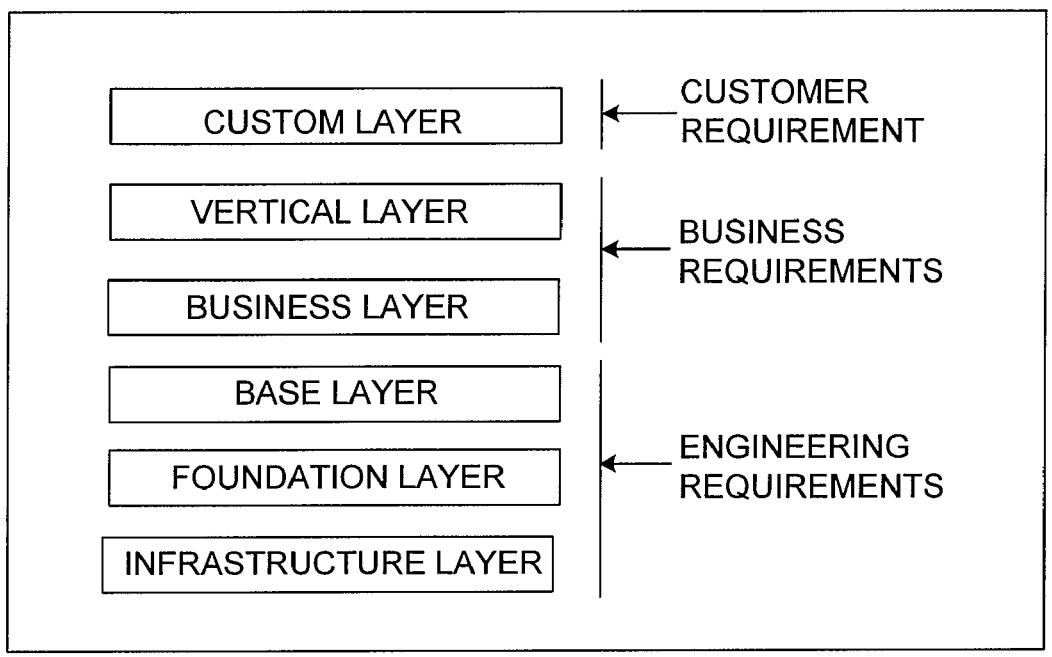
Figure 43:
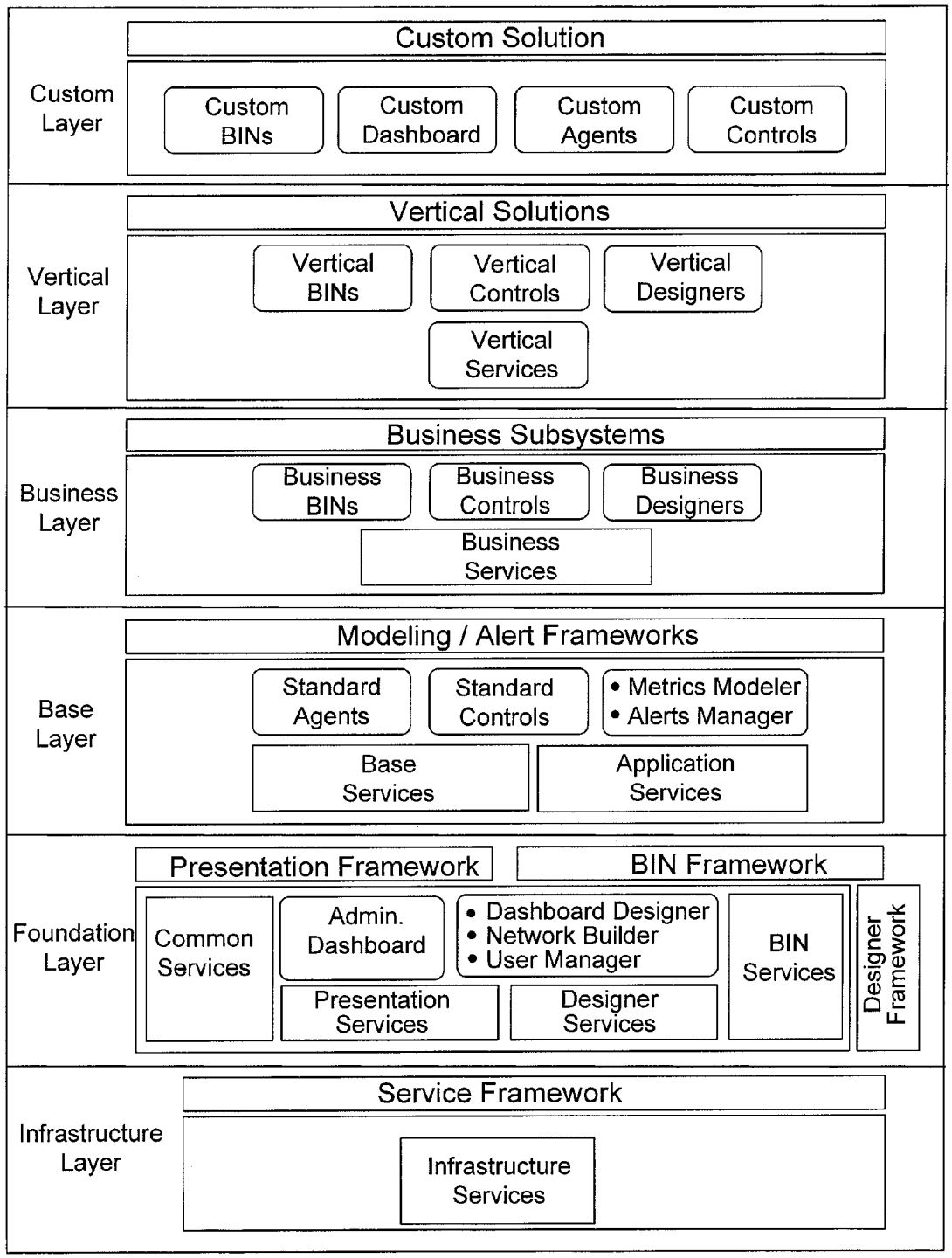

As shown in FIGS. 42 and 43, the system in some examples can be viewed as organized in six layers of applications: infrastructure, foundation, base, business, vertical, and custom. Higher layers have more functionality. At any given layer, the product is self-sufficient and offers a platform to build the next layer. The lower layers are more shielded from end-user requirements.

Each layer has a different design goal. The bottom three layers are driven by engineering requirements, the next two layers by business requirements, and the top-most layer by customer requirements. The design goals of engineering layers are modular design, reuse and maintainability and the requirements are driven through analyses models. The design goals of the business layer are governed by end-user experience and the requirements are driven through use cases. The customer layer is dictated by customer requirements.

The infrastructure layer provides a service framework to build, host and access services; its modules include infrastructure services, container service, naming service, and monitor service.

The foundation layer serves as a foundation to build the rest of the application and provides basic product platform, designer tools, and the following frameworks: BIN, presentation (to build dashboards), and designer (to build designer tools). Its modules include common services (message service, security service, log service), BIN services (BIN services, BIN runtime, BIN management, BIN admin), presentation services (admin dashboard), and a designer workbench (network builder, dashboard designer)

The base layer provides standard services, agents and controls. Modules in this layer are independent of each other. The next layer, business layer, uses these modules to build business subsystems. The modules of the business layer include base services (hypercube), inventory, notify, monitor, application services, metrics modeling, assembly, alert, standard agents (router, timer, SQL, Excel), standard controls (table), table (metrics table), metrics chart, dial (metrics dial), status (metrics status), target (metrics target), designer workbench, metrics modeler, alert manager, and monitor manager.

The business layer provides service silos. But to solve any business problem services interact. The business layer solves business problems through business subsystems. The business layer shields the layers below from inter-dependencies and keeps their designs modular and easy to manage and maintain. The modules of a business subsystem consists of one or more of service modules that follow the service framework, agents and BINs that follow the BIN framework, dashboard controls that follow the dashboard framework, and designer services that follow the designer framework All the pieces of a subsystem together solve a business problem. For example, the threshold notify subsystem solves the problem of monitoring thresholds on metrics and alerting the end users when thresholds are violated through email notifications. It brings together the functionalities of independent metrics modeling service, alert service and notification service and solves an end-user problem.

The vertical layer addresses the needs of vertical solutions. Its modules include specialized services, specialized BINs, specialized controls and dashboards, and specialized designers.

The custom layer solves customer problems. The modules of a custom solution may include custom BINs, custom controls and dashboards, and custom web services for backend connectivity.

Deployments

Figure 44:
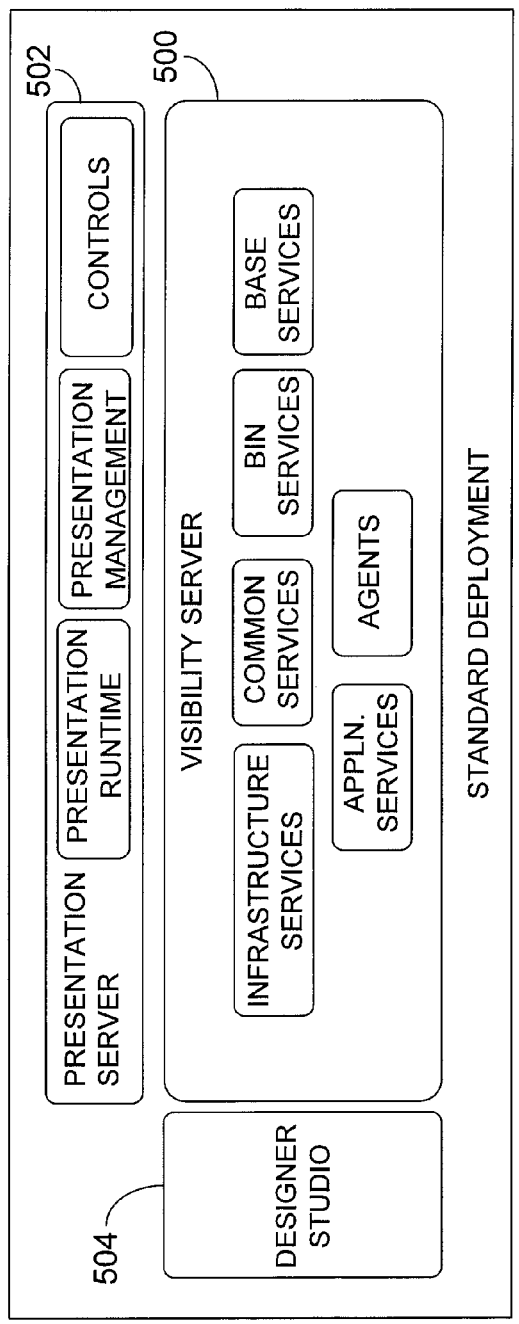
Figure 45:
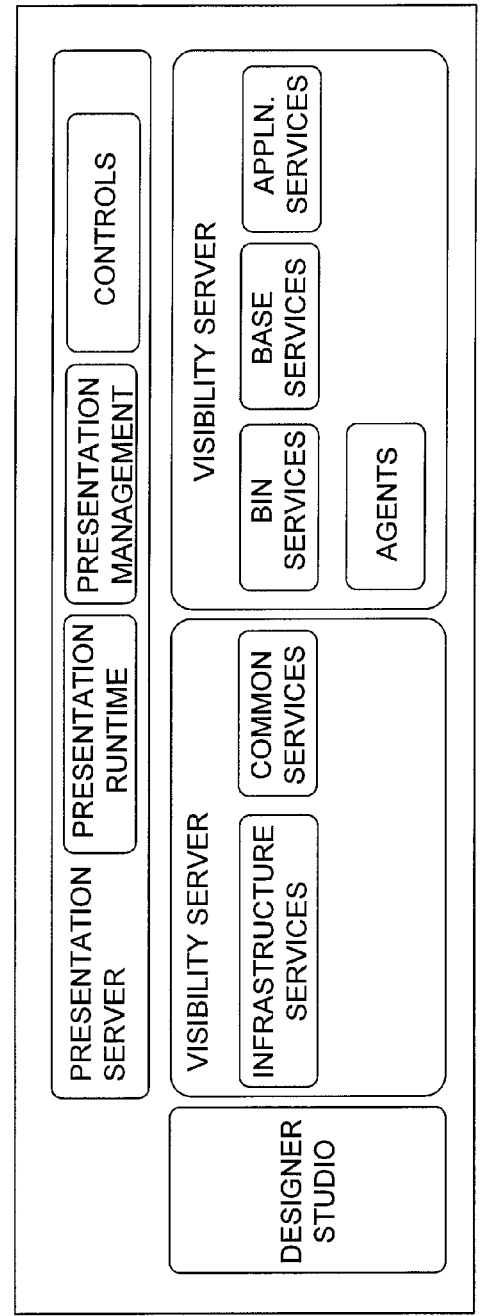
Figure 46:
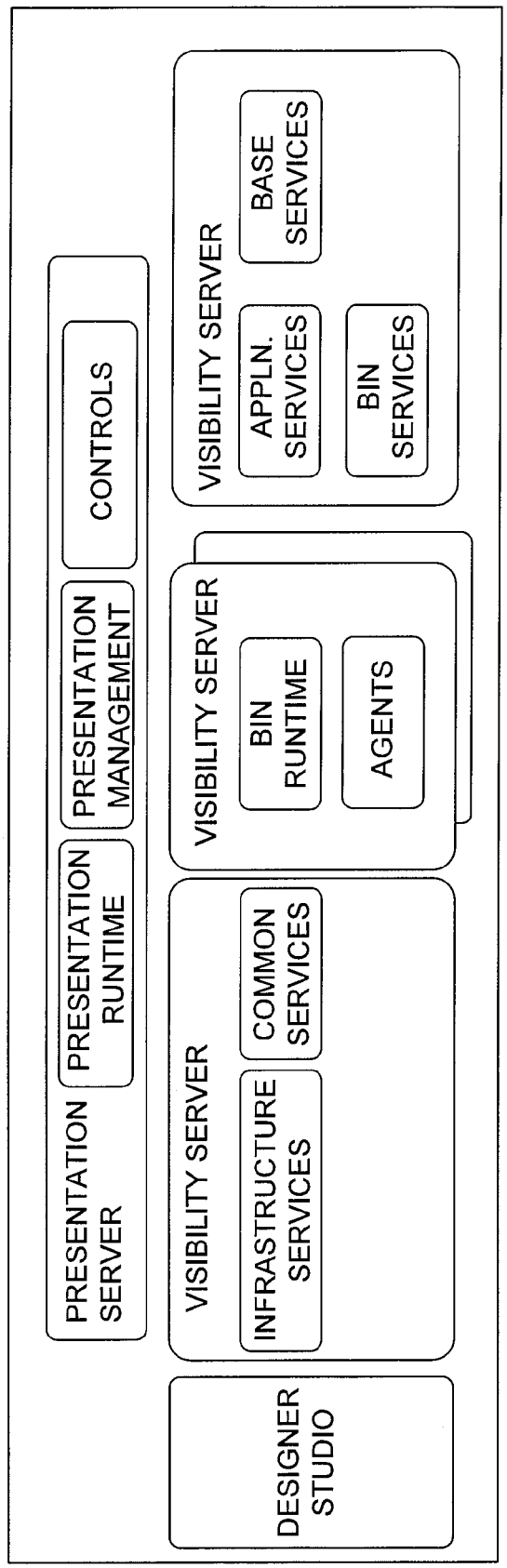

As shown in FIG. 44, a standard visibility system may be deployed in three processes: a visibility server 500, a presentation server 502, and a designer studio 504. The visibility server hosts a set of services and can be deployed in one machine or in multiple machines. In the standard deployment, all presentation services are deployed in one process called a presentation server and all other services are hosted in another process called a visibility server. In other arrangements, shown in FIGS. 45 and 46, services may be divided in different ways among multiple visibility servers.

Applications

Among examples of industries and classes of end users for whom applications can be built on the visibility system are the following: in the securities industry, sales and research, risk management, and merger and acquisition dashboards; in the information technology outsourcing industry, customer visibility dashboards; in the corporate management environment, performance dashboards that address, for example, supply and demand balance, and partner management; for governments, security dashboards.

Implementations

Figure 47:
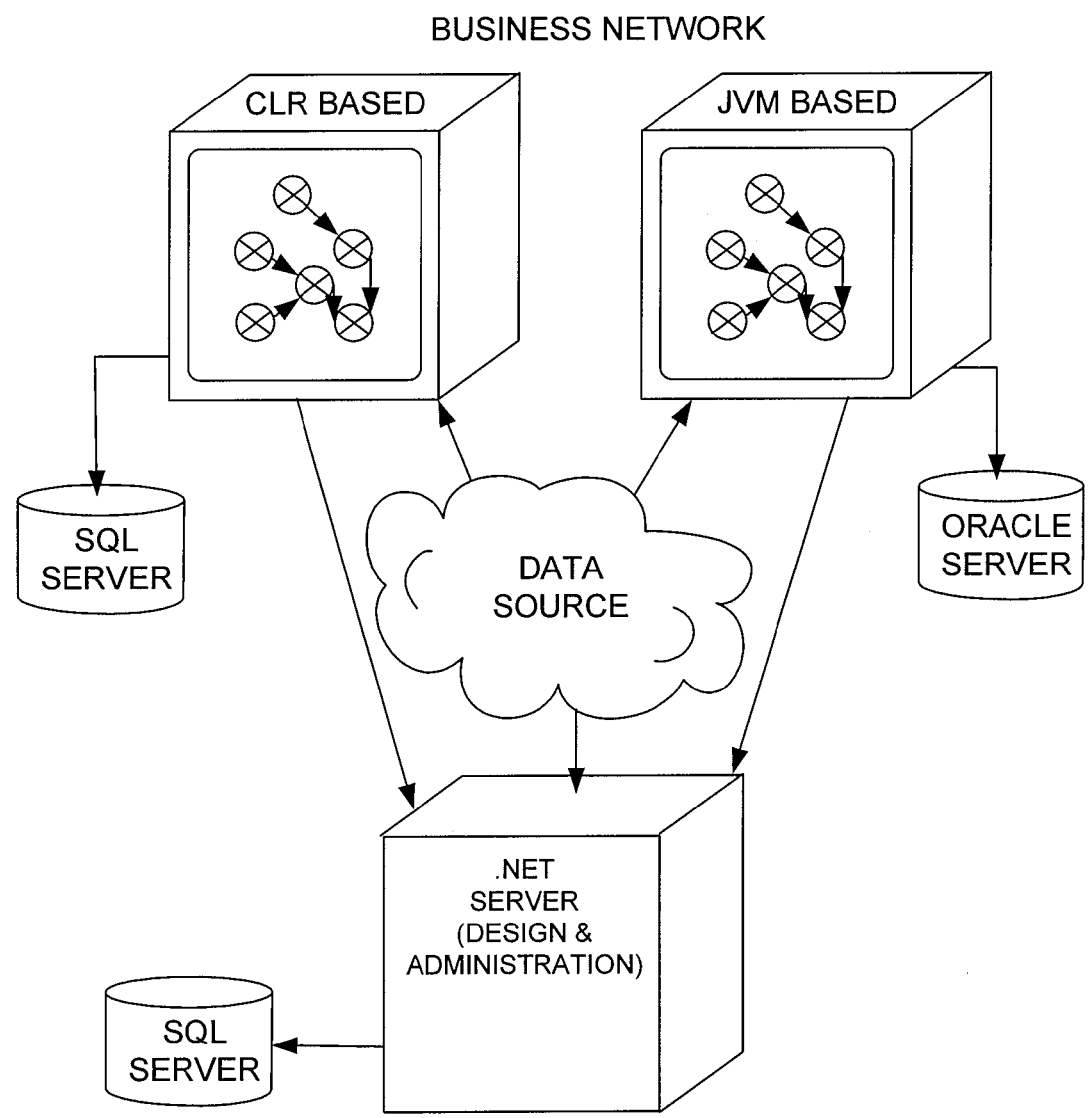

In some examples, the system is built around Microsoft technologies using the .NET framework and SQL server. J2ee and the rest of the enterprise is connected through web services and message services, by providing adapters to standard messaging services, like JMS, MQSeries, Tibco, and web methods. The system allows runtime versions to be developed and hosted under CLR (.NET) or JVM (J2EE) applications. A typical scenario is shown in FIG. 47.

Other implementations are within the scope of the following claims.

The invention claimed is:

1. A method comprising:
providing an application used to manage an enterprise, the application generating a body of aggregated and summarized information, the information being temporally consistent and based on underlying data sets that represent revenues of the enterprise and that are generated or stored at respective locations of the enterprise, at least some of the data in different ones of the data sets being expressed in a manner that is temporally and formally inconsistent, the data of the underlying data sets changing over time;
causing each of at least two different executable agents that are associated with respective underlying data sets to perform tasks on data in the associated underlying data set, to produce processed data, the processed data produced by the different executable agents being expressed in a manner that is formally consistent, temporally consistent, and current with respect to the information to be provided through the application used to manage an enterprise, the executable agents being organized in accordance with a network model, the executable agents being of a type from the group of: data extractor, data transformer, and information change monitor;
providing a modeling layer including a business entity model to map a universal model into a native model in the context of the enterprise; and
delivering the processed data among the agents to enable assembly of the body of aggregated and summarized information that is provided through the application used to manage an enterprise, based on the processed data, to be used to manage aspects of the enterprise.

2. The method of claim 1 in which the agents have ports to send and receive the processed data.

3. The method of claim 1 in which at least some of the processed data pass through routing devices between agents.

4. The method of claim 3 in which the routing devices comprise hubs, routers, and gateways.

5. The method of claim 1 in which the agents are part of a network that conforms to the network model and includes network links to deliver the processed data.

6. The method of claim 5 in which at least some of the links are temporary.

7. The method of claim 5 in which the temporary links define a dynamically configured network that conforms to the network model.

8. The method of claim 5 in which at least some of the links are persistent.

9. The method of claim 1 in which a group of the agents operate in a subnetwork that conforms to the network model, and the subnetwork comprises a portion of a network that conforms to the network model.

10. The method of claim 9 in which another instance of the subnetwork comprises a portion of another network that conforms to the network model.

11. The method of claim 1 in which the agents are distributed.

12. The method of claim 1 in which the agents are distributed at least in part geographically.

13. The method of claim 1 in which at least some of the associated information is stored in databases.

14. The method of claim 1 in which at least some of the processed data comprise events.

15. The method of claim 1 in which the agents comprise at least part of a network that conforms to the network model and a process external to the network makes requests to the network for at least portions of the processed data for use in assembling the body of aggregated and summarized information.

16. The method of claim 15 in which the external process comprises an expert engine.

17. The method of claim 16 in which the expert engine is driven by a model.

18. A method comprising:
providing an application used to manage an enterprise, the application generating a body of aggregated and summarized information, the information being temporally consistent and based on underlying data sets that represent revenues of the enterprise and that are generated or stored in repositories at respective locations of the enterprise, at least some of the data in different ones of the data sets being expressed in a manner that is temporally and formally inconsistent, the data of the underlying data sets changing over time;
from the repositories of data related to an enterprise, obtaining current data to be used in connection with managing aspects of the enterprise, the current data being provided by a plurality of agents being organized in accordance with a network model, the agents being of a type from the group of: data extractor, data transformer, and information change monitor;
enhancing the formal consistency of the current data received from different ones of the repositories;
temporarily storing portions of the enhanced current data to enhance temporal consistency of the current data;
using a model of the portion of the enterprise to analyze the temporally and formally enhanced current data and to generate resulting management data, the model including a modeling layer including a business entity model to map a universal model into a native model in the context of the enterprise; and
distributing the management data in a time frame that is current relative to the current data obtained from the repositories;
the identity of the current data of the data sets changing adaptively over time based on the model and on the resulting management data that is to be distributed.

19. The method of claim 18 in which the current data is pulled from the repositories.

20. The method of claim 18 in which the current data is pushed from the repositories.

21. The method of claim 18 also including storing the management data for later use.

22. The method of claim 18 in which the management data is distributed by notification to a process that uses the management data.

23. The method of claim 18 in which the management data is distributed by automated delivery of the management data to a process.

24. The method of claim 18 in which the current data is obtained in response to a need for the resulting management data to be distributed.

25. The method of claim 18 in which the current data is obtained at a time based on when the resulting management data is to be distributed.

26. The method of claim 18 in which the identity of the current data that is obtained is based on the identity of the management data that is to be distributed.

27. A method comprising:
providing an application used to manage an enterprise, the application generating a body of aggregated and summarized information, the information being temporally consistent and based on underlying data sets that represent revenues of the enterprise and that are generated or stored at repositories at respective locations of the enterprise, at least some of the data in different ones of the data sets being expressed in a manner that is temporally and formally inconsistent, the data of the underlying data sets changing over time;
providing a modeling layer including a business entity model to map a universal model into a native model in the context of the enterprise;
processing data from the repositories in an assembly line fashion to produce management data that is useful in managing aspects of the enterprise, the assembly line including at least two separate executable agents to perform tasks on the data, the executable agents being organized in accordance with a network model, the agents including:
a cleansing agent to process data that would not otherwise be useful in producing the management data,
a normalizing agent to normalize the data,
a transformation agent to enhance the consistency of the data,
an assembler agent to assemble data to form the management data, and
a staging agent to form and stage data for further processing; and
the sequence and tasks of the agents in the pipeline being adaptable to changes in the aspect of the enterprise being managed.

28. A method comprising:
providing an application used to manage an enterprise, the application generating a body of aggregated and summarized information, the information being temporally consistent and based on underlying data sets that represent revenues of the enterprise and that are generated or stored at respective locations of the enterprise, at least some of the data in different ones of the data sets being expressed in a manner that is temporally and formally inconsistent, the data of the underlying data sets changing over time;
providing a modeling layer including a business entity model to map a universal model into a native model in the context of the enterprise;
storing and updating, in a cube, multi-dimensional current data obtained from the data sets about an aspect of an enterprise;
storing, in a cube, data defining relationships between metrics used to manage a an aspect of the enterprise and the multi-dimensional current data;
storing, in a cube, metadata about the multi-dimensional current data; and
using the cubes to access current data in responding to queries, to generate the information useful in managing the aspect of the enterprise.

29. A method comprising:
providing an application used to manage an enterprise, the application generating a body of aggregated and summarized information, the information being temporally consistent and based on underlying data sets that represent revenues of the enterprise and that are generated or stored at respective locations of the enterprise, at least some of the data in different ones of the data sets being expressed in a manner that is temporally and formally inconsistent, the data of the underlying data sets changing over time;
accumulating processed data about an enterprise from the data sets using at least two separate executable agents organized in a network model, the processed data that are accumulated being determined by predefined analytical processes that are associated with functional aspects of the enterprise and that use the processed data to produce functional information about the enterprise, the enterprise belonging to a class of enterprises, the executable agents being organized in accordance with a network model, the executable agents being of a type from the group of: data extractor, data transformer, and information change monitor;
providing a modeling layer including a business entity model to map a universal model into a native model in the context of the enterprise; and
processing the functional information to produce the management information using the application, the application being reusable for other enterprises belonging to the class.

30. The method of claim 29 in which the class comprises manufacturers.

31. The method of claim 29 in which the class comprises financial services enterprises.

32. The method of claim 29 in which the functional aspects include at least one of financial, supply chain, information technology, and sales.

33. A physical article or object constituting a machine or manufacture and bearing instructions to cause a machine to:
provide an application used to manage an enterprise, the application generating a body of aggregated and summarized information, the information being temporally consistent and based on underlying data sets that represent revenues of the enterprise and that are generated or stored at respective locations of the enterprise, at least some of the data in different ones of the data sets being expressed in a manner that is temporally and formally inconsistent, the data of the underlying data sets changing over time;
cause each of at least two different executable agents that are associated with respective data sets to perform tasks on data in the associated data set, to produce processed data, the executable agents being organized in accordance with a network model, the executable agents being of a type from the group of: data extractor, data transformer, and information change monitor;
provide a modeling layer including a business entity model to map a universal model into a native model in the context of the enterprise; and
deliver the processed data among agents to enable assembly of the body of aggregated and summarized information that is provided through the application used in managing the enterprise, based on the processed data, to be used to manage aspects of the enterprise.

34. A physical article or object constituting a machine or manufacture and bearing instructions to cause a machine to:
provide an application used to manage an enterprise, the application generating a body of aggregated and summarized information, the information being temporally consistent and based on underlying data sets that represent revenues of the enterprise and that are generated or stored in repositories at respective locations of the enterprise, at least some of the data in different ones of the data sets being expressed in a manner that is temporally and formally inconsistent, the data of the underlying data sets changing over time;

from the repositories of data related to an enterprise, obtain current data to be used in connection with managing aspects of the enterprise, the current data being provided by a plurality of agents being organized in accordance with a network model, the agents being of a type from the group of: data extractor, data transformer, and information change monitor;

enhance the formal consistency of the current data received from different ones of the repositories;

temporarily store portions of the enhanced current data to enhance temporal consistency of the current data;

use a model of the portion of the enterprise to analyze the temporally and formally enhanced current data and to generate resulting management data, the model including a modeling layer including a business entity model to map a universal model into a native model in the context of the enterprise;

distribute the management data in a time frame that is current relative to the current data obtained from the repositories; and change the identity of the current data of the data sets adaptively over time based on the model and on the resulting management data that is to be distributed.

35. A physical article or object constituting a machine or manufacture and bearing instructions to cause a machine to:

provide an application used to manage an enterprise, the application generating a body of aggregated and summarized information, the information being temporally consistent and based on underlying data sets that represent revenues of the enterprise and that are generated or stored at repositories at respective locations of the enterprise, at least some of the data in different ones of the data sets being expressed in a manner that is temporally and formally inconsistent, the data of the underlying data sets changing over time;

provide a modeling layer including a business entity model to map a universal model into a native model in the context of the enterprise;

process data from the repositories in an assembly line fashion to produce management data that is useful in managing aspects of the enterprise, the assembly line including at least two separate executable agents to perform tasks on the data, the executable agents being organized in accordance with a network model, the agents including:

a cleansing agent to process data that would not otherwise be useful in producing the management data, a normalizing agent to normalize the data, a transformation agent to enhance the consistency of the data, an assembler agent to assemble data to form the management data, and a staging agent to form and stage data for further processing; and the sequence and tasks of the agents in the pipeline being adaptable to changes in the aspect of the enterprise being managed.

36. A physical article or object constituting a machine or manufacture and bearing instructions to cause a machine to:

provide an application used to manage an enterprise, the application generating a body of aggregated and summarized information, the information being temporally consistent and based on underlying data sets that represent revenues of the enterprise and that are generated or stored at respective locations of the enterprise, at least some of the data in different ones of the data sets being expressed in a manner that is temporally and formally inconsistent, the data of the underlying data sets changing over time;

provide a modeling layer including a business entity model to map a universal model into a native model in the context of the enterprise;

store and update, in a cube, multi-dimensional current data obtained from the data sets about an aspect of an enterprise;

store, in a cube, data defining relationships between metrics used to manage an aspect of the enterprise and the multi-dimensional current data;

store, in a cube, metadata about the multi-dimensional current data; and use the cubes to access current data in responding to queries, to generate the information useful in managing the aspect of the enterprise.

37. A physical article or object constituting a machine or manufacture and bearing instructions to cause a machine to:

provide an application used to manage an enterprise, the application generating a body of aggregated and summarized information, the information being temporally consistent and based on underlying data sets that represent revenues of the enterprise and that are generated or stored at respective locations of the enterprise, at least some of the data in different ones of the data sets being expressed in a manner that is temporally and formally inconsistent, the data of the underlying data sets changing over time;

accumulate processed data about an enterprise from the data sets using at least two separate executable agents organized in a network model, the processed data that are accumulated being determined by predefined analytical processes that are associated with functional aspects of the enterprise and that use the processed data to produce functional information about the enterprise, the enterprise belonging to a class of enterprises, the executable agents being organized in accordance with a network model, the executable agents being of a type from the group of: data extractor, data transformer, and information change monitor;

provide a modeling layer including a business entity model to map a universal model into a native model in the context of the enterprise; and process the functional information to produce the management information using the application, the application being reusable for other enterprises belonging to the class.

* * * * *